(12) United States Patent
Kojima

(10) Patent No.: US 10,730,518 B2
(45) Date of Patent: Aug. 4, 2020

(54) ON-BOARD RECORDING SYSTEM

(71) Applicant: TOYOTA JIDOSHA KABUSHIKI KAISHA, Toyota-shi, Aichi-ken (JP)

(72) Inventor: Takashi Kojima, Seto (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/246,067

(22) Filed: Jan. 11, 2019

(65) Prior Publication Data

US 2019/0210601 A1 Jul. 11, 2019

Related U.S. Application Data

(63) Continuation of application No. 15/209,198, filed on Jul. 13, 2016, now Pat. No. 10,214,213.

(30) Foreign Application Priority Data

Jul. 22, 2015 (JP) .................................. 2015-145290

(51) Int. Cl.
*B60W 30/18* (2012.01)
*G07C 5/02* (2006.01)
(Continued)

(52) U.S. Cl.
CPC ............ *B60W 30/18* (2013.01); *B60W 10/18* (2013.01); *B60W 10/20* (2013.01); *G07C 5/02* (2013.01);
(Continued)

(58) Field of Classification Search
USPC .......................................................... 701/36
See application file for complete search history.

(56) References Cited

U.S. PATENT DOCUMENTS 5,034,981 A * 7/1991 Leonard ................. H04N 7/169
348/E7.057
6,405,132 B1 * 6/2002 Breed .................... G01S 7/4802
701/301
(Continued)

FOREIGN PATENT DOCUMENTS

JP 2007208739 A 8/2007
JP 2007-293536 A 11/2007
(Continued)

OTHER PUBLICATIONS

Google Translation of Korean Patent Pub. No. KR101135101B1 that published in 2007.*

(Continued)

*Primary Examiner* — Jean Paul Cass
(74) *Attorney, Agent, or Firm* — Oliff PLC

(57) ABSTRACT

A system includes a first device and a second device connected via an on-board network. In a case where a driving assistance function is selectively installed on a vehicle, the first device transmits repeatedly a CAN frame having a predetermined CAN-ID from start of the vehicle to stop of the vehicle. The second device receives a CAN frame having a CAN-ID uniquely set for a function with regard to the vehicle. And the second device is configured to: (i) record to both a first recording region and a second recording region of a memory in a case where it is determined that the CAN-ID included in the received CAN frame is the predetermined CAN-ID; and (ii) record only to the second recording region in a case where it is not determined that the CAN-ID included in the received CAN frame is the predetermined CAN-ID.

5 Claims, 16 Drawing Sheets

(51) Int. Cl.
*G07C 5/08* (2006.01)
*B60W 10/18* (2012.01)
*B60W 10/20* (2006.01)

(52) U.S. Cl.
CPC .............. *G07C 5/08* (2013.01); *G07C 5/085* (2013.01); *B60W 2400/00* (2013.01); *B60W 2710/30* (2013.01)

(56) References Cited

U.S. PATENT DOCUMENTS

| | | | | |
|---|---|---|---|---|
| 7,110,880 | B2* | 9/2006 | Breed | G01S 17/89 701/482 |
| 7,202,776 | B2* | 4/2007 | Breed | G01S 19/42 340/435 |
| 7,313,467 | B2* | 12/2007 | Breed | G07C 5/008 307/9.1 |
| 7,418,346 | B2* | 8/2008 | Breed | G01S 17/86 701/301 |
| 7,421,321 | B2* | 9/2008 | Breed | B60C 11/24 340/442 |
| 7,629,899 | B2* | 12/2009 | Breed | G08G 1/163 340/903 |
| 7,630,802 | B2* | 12/2009 | Breed | G06K 7/10178 701/31.6 |
| 8,024,084 | B2* | 9/2011 | Breed | B60C 23/0493 340/438 |
| 8,169,311 | B1* | 5/2012 | Breed | B60N 2/2806 340/438 |
| 8,725,311 | B1* | 5/2014 | Breed | A61B 5/163 701/1 |
| 9,632,506 | B2* | 4/2017 | Wellman | G06Q 10/0631 |
| 10,214,213 | B2* | 2/2019 | Kojima | G07C 5/02 |
| 2008/0195261 | A1* | 8/2008 | Breed | B60R 21/01516 701/2 |
| 2009/0153312 | A1* | 6/2009 | Tanaka | B60Q 9/00 340/426.1 |
| 2011/0071718 | A1* | 3/2011 | Norris | B60T 7/22 701/23 |
| 2013/0028320 | A1* | 1/2013 | Gardner | H04N 21/2381 375/240.12 |
| 2014/0232863 | A1* | 8/2014 | Paliga | H04N 21/23418 348/143 |
| 2014/0276090 | A1* | 9/2014 | Breed | A61B 5/18 600/473 |
| 2014/0300739 | A1* | 10/2014 | Mimar | H04N 7/188 348/148 |
| 2014/0335888 | A1 | 11/2014 | Nomura | |
| 2015/0061895 | A1* | 3/2015 | Ricci | G06F 16/25 340/902 |
| 2015/0301528 | A1* | 10/2015 | Fredriksson | B64C 39/024 701/2 |
| 2017/0155585 | A1* | 6/2017 | Meng | H04L 45/745 |

FOREIGN PATENT DOCUMENTS

| | | | |
|---|---|---|---|
| JP | 2010-134562 A | 6/2010 | |
| JP | 2010215008 A | 9/2010 | |
| JP | 2014-218167 A | 11/2014 | |
| JP | 2015-003589 A | 1/2015 | |
| KR | 101135101 B1 * | 4/2012 | ......... H04L 12/4135 |

OTHER PUBLICATIONS

NPL, International Standard ISO 11898-1 Road Vehicle, Controller Area Network, Data Link Layer and Physical Signaling, (2003.*
Jul. 18, 2017 Office Action Issued in U.S. Appl. No. 15/209,198.
Feb. 12, 2018 Office Action issued in U.S. Appl. No. 15/209,198.

* cited by examiner

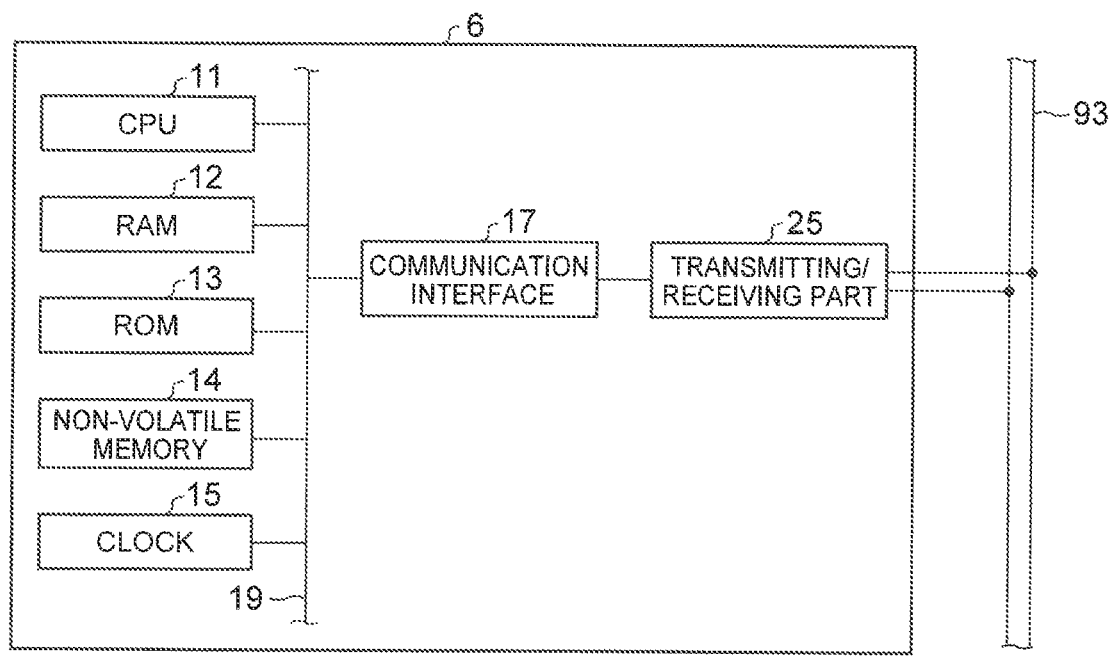
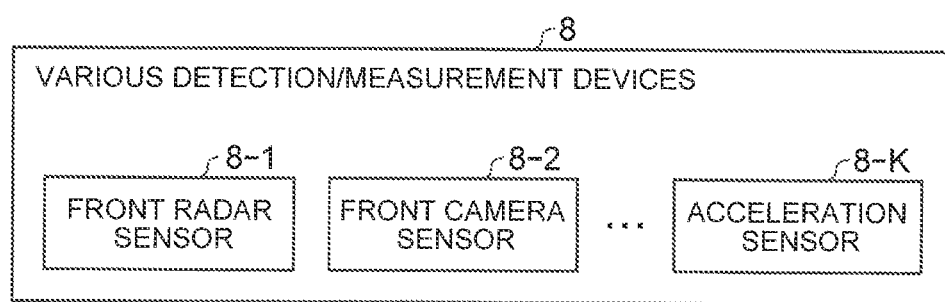

FIG. 5

| CAN ID | ASSIGNMENT |
|---|---|
| ⋮ | |
| aaa | LKA ACTIVATION |
| bbb | LKA ACTIVATION |
| ccc | LKA ACTIVATION |
| ⋮ | |
| ddd | PCS ALERT ACTIVATION |
| eee | PCS ALERT ACTIVATION |
| fff | PCS ALERT ACTIVATION |
| ⋮ | |
| ggg | PCS BRAKE ACTIVATION |
| hhh | PCS BRAKE ACTIVATION |
| iii | PCS BRAKE ACTIVATION |
| ⋮ | |

FIG. 10A

| RECORDING AREA | TYPE OF VEHICLE BEHAVIOR |
|---|---|
| RA1-1 | VSC ACTIVATION |
| RA1-2 | ABS ACTIVATION |
| RA1-3 | TRC ACTIVATION |
| RA2-1 | |
| RA2-2 | |
| RA2-3 | |

FIG. 10B

| RECORDING AREA | TYPE OF VEHICLE BEHAVIOR |
|---|---|
| RA1-1 | VSC ACTIVATION |
| RA1-2 | ABS ACTIVATION |
| RA1-3 | TRC ACTIVATION |
| RA2-1 | LKA ACTIVATION |
| RA2-2 | PCS ALERT ACTIVATION |
| RA2-3 | PCS BRAKE ACTIVATION |

FIG. 10C

| RECORDING AREA | TYPE OF VEHICLE BEHAVIOR |
|---|---|
| RA1-1 | VSC ACTIVATION |
| RA1-2 | ABS ACTIVATION |
| RA1-3 | TRC ACTIVATION |
| RA2-1 | VSC ACTIVATION |
| RA2-2 | PCS ALERT ACTIVATION |
| RA2-3 | TRC ACTIVATION |

FIG. 11A

| RECORDING AREA | TYPE OF VEHICLE BEHAVIOR |
|---|---|
| RA1-1 | VSC ACTIVATION |
| RA1-2 | ABS ACTIVATION |
| RA1-3 | TRC ACTIVATION |
| RA2-1 | VSC ACTIVATION |
| RA2-2 | PCS ALERT ACTIVATION |
| RA2-3a | ABS ACTIVATION |
| RA2-3b | TRC ACTIVATION |

FIG. 11B

| RECORDING AREA | TYPE OF VEHICLE BEHAVIOR |
|---|---|
| RA1-1 | VSC ACTIVATION |
| RA1-2 | ABS ACTIVATION |
| RA1-3 | TRC ACTIVATION |
| RA2-1 | VSC ACTIVATION |
| RA2-2 | PCS ALERT ACTIVATION |
| RA2-3 | PCS ALERT ACTIVATION |

FIG. 17A

| RECORDING AREA | TYPE OF VEHICLE BEHAVIOR |
|---|---|
| RA1-1 | VSC ACTIVATION |
| RA1-2 | ABS ACTIVATION |
| RA1-3 | TRC ACTIVATION |
| RA2-1 | VSC ACTIVATION |
| RA2-2 | ABS ACTIVATION |
| RA2-3 | TRC ACTIVATION |

FIG. 17B

| RECORDING AREA | TYPE OF VEHICLE BEHAVIOR |
|---|---|
| RA1-1 | VSC ACTIVATION |
| RA1-2 | ABS ACTIVATION |
| RA1-3 | TRC ACTIVATION |
| RA2-1 | VSC ACTIVATION |
| RA2-2 | PCS ALERT ACTIVATION |
| RA2-3 | TRC ACTIVATION |

ON-BOARD RECORDING SYSTEM

RELATED APPLICATIONS AND INCORPORATION BY REFERENCE

This application is a Continuation Application of U.S. patent application Ser. No. 15/209,198, filed on Jul. 13, 2016, which claims priority to Japanese Patent Application No. 2015-145290, filed on Jul. 22, 2015. The contents of these applications are incorporated herein by reference in their entirety.

BACKGROUND OF THE INVENTION

1. Field of the Invention

The invention relates to an on-board recording system that records vehicle information concerning a state of a vehicle, when it detects particular types of vehicle behaviors including activation of driving assistance functions.

2. Description of Related Art

An on-board recording system is known which records vehicle information (information concerning an operating state of the vehicle, control state of the vehicle, environmental conditions around the vehicle, status of the driver of the vehicle, etc.) when it detects particular types of vehicle behaviors (see, for example, Japanese Patent Application Publication No. 2007-293536 (JP 2007-293536 A)). With the on-board recording system, various analyses concerning vehicle behaviors (e.g., analysis of the process leading to a particular vehicle behavior, change of the vehicle state corresponding to a particular vehicle behavior, etc.) can be conducted.

For example, the types of vehicle behaviors for which vehicle information is recorded may include activation of driving assistance functions (e.g., a driving assistance function for steering stability, a driving assistance function for collision avoidance, etc.) installed on the vehicle. These driving assistance functions are often provided as optional equipment.

However, a memory having a relatively small capacity is often employed as a memory (e.g., a non-volatile memory, such as EEPROM) for recording vehicle information, because of the usage environment (for example, a temperature environment of a wide range from a high temperature to an extremely low temperature), high cost due to the durability and reliability, and limited installation space in the first place, for example. In this case, when a recording area for recording corresponding vehicle information is allocated for each type of vehicle behavior to be detected, the recording area can only be allocated for each type of vehicle behavior to be detected, to such an extent that data corresponding to the minimum number of times of detection necessary for useful analysis can be recorded. Therefore, when a certain driving assistance function as optional equipment is not installed on the vehicle, it is desirable that the recording area that can be used for recording vehicle information corresponding to activation of the driving assistance function as optional equipment is effectively utilized for recording vehicle information corresponding to another type of vehicle behavior.

SUMMARY OF THE INVENTION

Thus, an on-board recording system is provided which is able to utilize a recording area that can be used for recording vehicle information corresponding to activation of a driving assistance function as optional equipment, as a recording area for recording vehicle information corresponding to another type of vehicle behavior, in a case where the driving assistant function is not installed on the vehicle.

In a first aspect of the invention, an on-board recording system includes a control device that performs vehicle control including control associated with a driving assistance function selectively installed on a vehicle, and a recording device communicably connected to the control device via an on-board network. The recording device records vehicle information representing a state of the vehicle when any of pre-specified types of vehicle behaviors is detected, and the vehicle information is specified in advance for each of the pre-specified types of vehicle behaviors, and is obtained in a predetermined period corresponding to a time of detection at which the vehicle behavior is detected. In the on-board recording system, the control device includes a transmitting unit that outputs a transmission signal to the on-board network in a case where the driving assistance function is installed on the vehicle, and the recording device includes a receiving unit, a determining unit, a received information storage unit, a vehicle information storage unit, a first vehicle behavior detecting unit, a second vehicle behavior detecting unit, a first recording processing unit, a second recording processing unit, and a recording permitting unit. The receiving unit receives the transmission signal. The determining unit determines whether the receiving unit has received the transmission signal. The received information storage unit stores a result of determination by the determining unit, as received information. The vehicle information storage unit includes a recording area set for each type of the vehicle behaviors, and the recording area has a capacity that permits recording of the vehicle information for a pre-specified number of detection for each type of the vehicle behaviors. The first vehicle behavior detecting unit detects a first vehicle behavior as activation of the driving assistance function, among the vehicle behaviors, and the second vehicle behavior detecting unit detects a second vehicle behavior of a different type from the first vehicle behavior, among the vehicle behaviors. The first recording processing unit records first vehicle information as the vehicle information corresponding to the first vehicle behavior, in a first area as the recording area corresponding to the first vehicle behavior, when the first vehicle behavior detecting unit detects the first vehicle behavior. The second recording processing unit records second vehicle information as the vehicle information corresponding to the second vehicle behavior, in at least one of the first area, and a second area as the recording area corresponding to the second vehicle behavior, when the second vehicle behavior detecting unit detects the second vehicle behavior. The recording permitting unit permits the first recording processing unit to record the first vehicle information in the first area, and permits the second recording processing unit to record the second vehicle information in the second area, while inhibiting the second recording processing unit from recording the second vehicle information in the first area, when the received information indicates that the transmission signal has been received. The recording permitting unit permits the second recording processing unit to record the second vehicle information in the first area and the second area, when the received information indicates that the transmission signal has not been received.

According to the first aspect of the invention, the on-board recording system includes the control device that performs vehicle control including control associated with the driving assistance function (optional function) selectively installed on the vehicle, and the recording device that is communicably connected to the control device via the on-board network. When any of pre-specified types of vehicle behaviors is detected, the recording device records vehicle information representing a state of the vehicle, which information is specified in advance for each type of the vehicle behavior, over a predetermined period corresponding to the time of detection. The "state of the vehicle" is a concept including moving conditions (the acceleration, vehicle speed, etc.) of the vehicle, control state (control commands, command values, etc.) of the vehicle, traveling conditions (a distance from a preceding vehicle, etc.) of the vehicle, operating conditions (switching operation, accelerator signal, etc.) of the vehicle, the status of occupants of the vehicle, and so forth. The control device includes the transmitting unit that outputs the transmission signal (transmission signal corresponding to the optional function) to the on-board network when the optional function is installed on the vehicle. The transmission signal is a communication frame including information concerning the driving assistance function in its data portion, no matter what communication protocol is employed by the on-board network, for example. When the on-board network is CAN (Controller Area Network), for example, the transmission signal is a CAN frame having a CAN-ID uniquely assigned to the optional function. Also, the recording device includes the receiving unit that receives the transmission signal generated from the transmitting unit to the on-board network, determining unit that determines whether the transmission signal has been received by the receiving unit, received information storage unit that stores the result of determination by the determining unit, as received information, and the vehicle information storage unit including the recording area set for each type of vehicle behavior, which area has a capacity that permits recording of vehicle information for a pre-specified number of times of detection, for each type of vehicle behavior. The received information is in the form of flag information to which the initial value ("0") is given when the transmission signal has not been received, and a different value ("1") is given when the transmission signal has been received. The "pre-specified number of times of detection" corresponds to the number of items of data at the minimum level necessary for useful analysis regarding each of the vehicle behaviors of the types to be detected, for example. Also, the recording device includes the first vehicle behavior detecting unit that detects the first vehicle behavior as activation of the optional function, second vehicle behavior detecting unit that detects the second vehicle behavior of a type different from the first vehicle behavior, first recording processing unit that records the first vehicle information as vehicle information corresponding to the first vehicle behavior, in the first area as a recording area corresponding to the first vehicle behavior, when the first vehicle behavior detecting unit detects the first vehicle behavior, and the second recording processing unit that records the second vehicle information as vehicle information corresponding to the second vehicle behavior, in at least one of the first area, and the second area as a recording area corresponding to the second vehicle behavior, when the second vehicle behavior detecting unit detects the second vehicle behavior. The recording device includes the recording permitting unit that permits the first recording processing unit to record the first vehicle information in the first area, and permits the second recording processing unit to record the second vehicle information in the second area, while inhibiting the second recording processing unit from recording the second vehicle information in the first area, when the received information indicates that the transmission signal has been received. When the received information indicates that the transmission signal has not been received, the recording permitting unit permits the second recording processing unit to record the second vehicle information in the first area and the second area.

Thus, according to the first aspect of the invention, the transmitting unit of the control device that performs control associated with an optional function outputs the transmission signal to the on-board network when the optional function is installed on the vehicle. Also, the receiving unit of the control device receives the transmission signal via the on-board network, and the determining unit of the control device determines whether the receiving unit has received the transmission signal. Then, the received information storage unit of the control device stores received information as the result of determination by the determining unit, namely, received information indicating whether the receiving unit has received the transmission signal. With this arrangement, when the received information indicates that the transmission signal has been received, it can be determined that the optional function is installed on the vehicle. Therefore, in this case, the recording permitting unit permits the first recording processing unit to record the first vehicle information in the first area within the vehicle information storage unit, and inhibits the second recording processing unit from recording the second vehicle information in the first area. On the other hand, when the received information indicates that the transmission signal has not been received, it can be determined that the optional function is not installed on the vehicle. Therefore, in this case, the recording permitting unit permits the second recording processing unit to record the second vehicle information in the first area within the vehicle information storage unit. Accordingly, when it can be determined that the optional function is not installed on the vehicle, the first area that can be used for recording the first vehicle information corresponding to the first vehicle behavior as activation of the optional function can be effectively utilized for recording the second vehicle information corresponding to the second vehicle behavior. In particular, the vehicle information storage unit is likely to have a relatively low capacity; therefore, the recording area that can be allocated for each of the vehicle behaviors of the types to be detected is often limited to the minimum level of capacity necessary for useful analysis. Accordingly, by expanding the recording area corresponding to the vehicle behavior (second vehicle behavior) of a type different from activation of the optional function, it is possible to enhance the usefulness of analysis corresponding to the second vehicle behavior.

In a second aspect of the invention, the transmitting unit may output the transmission signal to the on-board network, when the vehicle is started.

According to the second aspect of the invention, upon starting of the vehicle, the transmission signal corresponding to the driving assistance function is generated to the on-board network, such as CAN. The "starting of the vehicle" means that the vehicle is brought into a state where it is able to travel according operation of the driver, and represents a concept including turn-on of the ignition key (IG-ON) in a gasoline engine vehicle, and start-up of a control device (e.g., HV-ECU) that performs coordinated control on the whole vehicle in an electric vehicle (including a hybrid vehicle and a range extender vehicle), for example. Therefore, when the vehicle is started for the first time, after factory shipping, for example, the receiving unit of the control device receives the transmission signal, and the determining unit determines that the transmission signal has been received, so that received information indicating that the transmission signal has been received is stored in the received information storage unit. Thus, it can be determined whether the optional function is installed, at the time when the vehicle is started for the first time; therefore, when the optional function is installed, the first area is not utilized for recording the second vehicle information corresponding to the second vehicle behavior different from the first vehicle behavior as activation of the optional function (for example, a situation where data of the first vehicle information corresponding to the first vehicle behavior is mixed with data of the second vehicle information corresponding to the second vehicle behavior can be avoided). Namely, the reliability of data of the first vehicle information corresponding to the first vehicle behavior as activation of the optional function, which data is recorded in the first area, can be enhanced. Also, even when the optional function is subsequently installed, it can be determined whether the optional function is installed, at the time when the vehicle is started for the first time after the additional installation of the optional function; therefore, substantially the same effect is yielded.

In a third aspect of the invention, the control device may include a control command creating unit that outputs a control command associated with activation of the driving assistance function, to the on-board network, and the transmission signal may be the control command.

According to the third aspect of the invention, the transmission signal is the control command associated with activation of the driving assistance function. Namely, the control command for activating the driving assistance function is also used as the transmission signal corresponding to the optional function, so that it can be determined whether the optional function is installed on the vehicle. Therefore, as compared with the case where a dedicated transmission signal is provided, increase in the cost of the on-board recording system as a whole, and increase in the processing load in the control device, can be suppressed. Also, until the control command is generated to the on-board network, namely, until the optional function is activated, the receiving unit of the recording device does not receive the control command as the transmission signal, and the determining unit does not determine that the transmission signal has been received; therefore, received information indicating that the transmission signal has not been received is stored in the received information storage unit. Therefore, even when the optional function is installed, the first area for recording the first vehicle information corresponding to the first vehicle behavior as activation of the optional function can be effectively utilized as a recording area for recording the second vehicle information corresponding to the second vehicle behavior different from the first vehicle behavior, until the optional function is activated.

In a fourth aspect of the invention, the on-board network may be a CAN, and the transmission signal may be a CAN frame having a CAN-ID that is uniquely given to the driving assistance function.

According to the fourth aspect of the invention, the transmission signal is the CAN frame having the CAN-ID uniquely assigned to the driving assistance function. Namely, in the framework of the CAN generally and widely used as an on-board network, the transmission signal can be realized only by assigning a unique CAN-ID to the driving assistance function. Therefore, increase of the cost of the on-board recording system as a whole can be suppressed.

According to the above-described forms of the invention, it is possible to provide an on-board recording system that is able to utilize a recording area that can be used for recording vehicle information corresponding to activation of a driving assistance function as optional equipment, as a recording area for recording vehicle information corresponding to another type of vehicle behavior, in a case where the driving assistance function is not installed on the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a view schematically showing one example of the hardware configuration of an information recording ECU;

FIG. 4 is a view schematically showing one example of the configuration of various detection/measurement devices;

FIG. 5 is a view showing one example of CAN-IDs uniquely assigned to driving assistance functions (LKA, PCS) as optional equipment;

FIG. 10A is a view useful for explaining one example of recording area allocating operation performed by the recording area allocating unit according to the first embodiment, more specifically, a view showing allocation conditions of recording areas RA1-1 to RA1-3, and recording areas RA2-1 to RA2-3, at the line-off stage of the vehicle;

FIG. 10B is a view useful for explaining one example of recording area allocating operation performed by the recording area allocating unit according to the first embodiment, more specifically, a view showing allocation conditions of recording areas RA1-1 to RA1-3, and recording areas RA2-1 to RA2-3, when it is determined that all of the functions of PCS alert, PCS brake, and LKA as optional functions are installed on the vehicle;

FIG. 10C is a view useful for explaining one example of recording area allocating operation performed by the recording area allocating unit according to the first embodiment, more specifically, a view showing allocation conditions of recording areas RA1-1 to RA1-3, and recording areas RA2-1 to RA2-3, when it is determined that only the function of PCS alert, as one of the optional functions, is installed;

FIG. 11A is a view useful for explaining another example of recording area allocating operation performed by the recording area allocating unit according to the first embodiment;

FIG. 11B is a view useful for explaining another example of recording area allocating operation performed by the recording area allocating unit according to the first embodiment;

FIG. 17A is a view useful for explaining one example of the operation to allocate recording areas by the recording area allocating unit according to the second embodiment, more specifically, a view showing allocation conditions of recording areas RA1-1 to RA1-3, and recording areas RA2-1 to RA2-3, at the line-off stage of the vehicle;

FIG. 17B is a view useful for explaining one example of the operation to allocate recording areas by the recording area allocating unit according to the second embodiment, more specifically, a view showing allocation conditions of recording areas RA1-1 to RA1-3, and recording areas RA2-1 to RA2-3, when the PCS alert as an optional function is activated.

DETAILED DESCRIPTION OF EMBODIMENTS

Some embodiments of the invention will be described with reference to the drawings.

Figure 1:
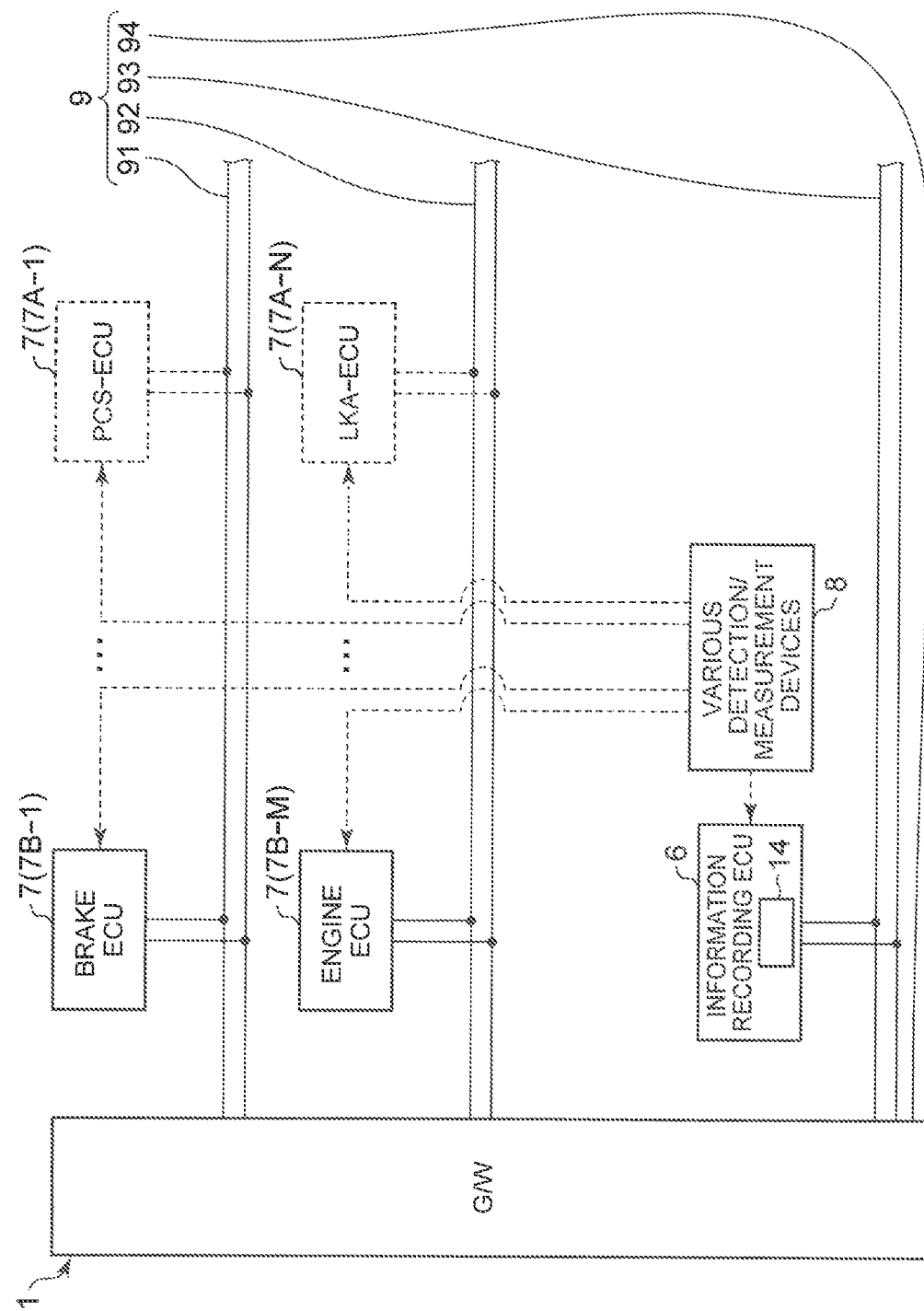
FIG. 1 is a view schematically showing one example of the configuration of an on-board recording system.

FIG. 1 schematically shows one example of the configuration of an on-board recording system 1 according to a first embodiment. The on-board recording system 1 is installed on a vehicle, and records vehicle information (vehicle behavior data) representing a state of the vehicle, which information is specified in advance for each type of vehicle behavior, when pre-specified types of vehicle behaviors are detected. In the following, "vehicle" refers to the vehicle on which the on-board recording system 1 is installed, unless otherwise specifically noted.

The "vehicle behavior" is behavior of the vehicle which is triggered by a control value calculated for controlling the vehicle, or an operation signal generated according to operation of a vehicle occupant (such as a driver), for example. The types of vehicle behaviors to be detected are specified in advance, according to the purpose of analysis, etc. For example, the vehicle behaviors to be detected include activation of particular driving assistance functions (such as alert control functions and intervention control functions) implemented when particular conditions are satisfied. The alert control functions include an alert (which will be called "PCS alert") for avoidance of collision with an obstacle in front of the vehicle, LDA (Lane Departure Alert), CTA (Cross Traffic Alert), and so forth. The intervention control functions are control functions implemented irrespective of operation by the driver, and includes automatic brake (which will be called "PCS brake") for avoidance of collision with an obstacle in front of the vehicle, VSC (Vehicle Stability Control), ABS (Anti-lock Brake System), TRC (Traction Control), LKA (Lane Keeping Assist), and so forth. The vehicle behaviors to be detected may also include vehicle behaviors caused by particular manipulations, for example. The vehicle behaviors caused by particular manipulations include simultaneous generation of an accelerator signal (an accelerator pedal stroke larger than 0) and a brake signal (a brake pedal operation amount larger than 0), the accelerator pedal stroke becoming middle or large in the N range, sudden braking (of such a degree that causes ABS to operate when it rains), emergency braking (more urgent braking than sudden braking), sudden turning, and so forth. The following description will be provided on the assumption that there are J types of vehicle behaviors to be detected.

Also, the "state of the vehicle" is a concept including moving conditions (the acceleration, speed, etc. based on sensor values or calculation values) of the vehicle, control state (operational commands, command values, etc. of control) of the vehicle, traveling conditions (a distance from a preceding vehicle, a traveling lane, etc. based on sensor values or calculation values) of the vehicle, environmental conditions (such as an inside temperature, outside temperature, presence or absence of rain drops, etc. based on sensor values) of the vehicle, and the status (such as an image of the driver obtained from a camera sensor, for example) of occupants (including the driver) of the vehicle. As described above, the types of vehicle information to be recorded are specified in advance for each type of vehicle behavior. This is because the type(s) of vehicle information that would be useful for analysis may differ depending on the type of vehicle behavior. Also, there may be two or more types of vehicle information to be recorded, for a certain vehicle behavior.

As shown in FIG. 1, the on-board recording system 1 includes an information recording ECU 6 and various ECUs 7 which are connected by CAN (Controller Area Network) 9 as one example of on-board network, and various detection/measurement devices 8 connected to the information recording ECU 6 and various ECU 7 such that they can communicate with each other. The information recording ECU 6 is provided in a lower portion of a center console in the vehicle interior, for example.

The CAN 9 includes CAN buses 91-93, and a gateway (G/W) 94, and the CAN buses 91-93 are connected to one another via the G/W 94. Various ECUs 7 are connected to the CAN bus 91 or CAN bus 92, and the information recording ECU 6 is connected to the CAN bus 93, while the information recording ECU 6 and various ECUs 7 are connected via the G/W 94, such that they can communicate with each other according to the CAN protocol.

The above-described manner of connecting the information recording ECU 6 and various ECUs 7 is a mere example, and the respective ECUs 6, 7 may be connected on the same CAN bus in the CAN 9, without involving the G/W 94.

Figure 2:
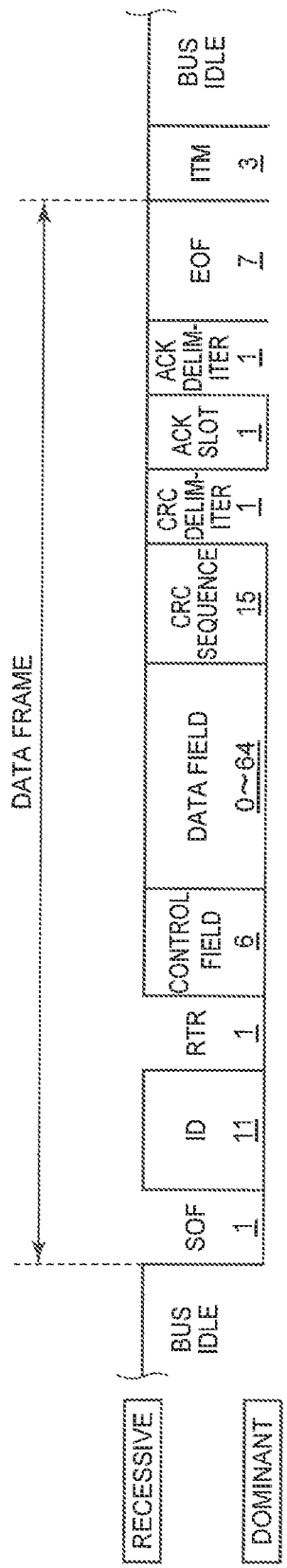
FIG. 2 is a view showing one example of a frame type according to the CAN protocol.

A CAN frame (data frame) according to a standard format of the CAN protocol has a structure as shown in FIG. 2 (a view showing one example of a frame type according to the CAN protocol). More specifically, the CAN frame (data frame) consists of SOF (Start Of Frame, 1 bit), ID (11 bits), RTR (1 bit), control field (6 bits), data field (0-64 bits), CRC sequence (15 bits), CRC delimiter (1 bit), ACK slot (1 bit), ACK delimiter (1 bit), and EOF (End Of Frame, 7 bits). Data to be transmitted by the CAN frame is included in the data field, and the CAN frame can transmit up to 8-byte data in the unit of byte. The length of the data included in the CAN frame is set between 0 and 8, using 4 bits of DLC (Data Length Code) in the control field.

The ID is used for identifying data content, transmission node, etc., and has a function of determining the priority order for communication arbitration (arbitration conducted when communication frames are simultaneously generated from two or more nodes onto the CAN buses 91-93) in the CAN 9 (the priority is higher as the ID is smaller). Since the ID having a length of 11 bits ranges from 0x0 to 0x7FF (in hexadecimal), IDs capable of identifying a maximum of 2048 types can be assigned to the CAN frames. Also, in a CAN frame (not shown) according to an extended format of the CAN protocol, an extended ID (18 bits) are provided, in addition to a base ID (11 bits) corresponding to the ID in the standard format. Therefore, the ID having a length of 29 bits as a combination of the base ID and the extended ID ranges from 0x0-1FFFFFFF (in hexadecimal); therefore, IDs capable of identifying a maximum of about 5.4 million types can be assigned to the CAN frames.

Thus, the information recording ECU 6 and various ECUs 7 transmit and receive CAN frames in the CAN 9, according to the pre-assigned IDs, so as to receive necessary data by identifying the CAN frames on the CAN 9 (CAN buses 91, 92, 93). In the following description, the ID in the standard format, and a combination of the base ID and the extended ID in the extended format will be called "CAN-ID".

FIG. 3 schematically shows one example of the hardware configuration of the information recording ECU 6.

The information recording ECU 6 includes CPU 11, RAM 12, ROM 13, non-volatile memory 14, clock 15, and a communication interface 17, which are connected by an internal bus 19, and a transmitting/receiving part 25 connected to the communication interface 17.

The non-volatile memory 14 is, for example, EEPROM (Electrically Erasable Programmable Read-Only Memory), or the like. A memory having a relatively low capacity of several tens of KB (kilobytes) to several hundreds of KB, for example, may be employed as the non-volatile memory 14, in view of the installation space and cost. The transmitting/receiving part 25 includes a CAN transceiver and a CAN driver, and is connected to the CAN bus 93. The transmitting/receiving part 25 also includes a transmitting/receiving part capable of communicating with various detection/measurement devices 8, using any communicating means (e.g., CAN 9, LIN (Local Interconnect Network), or one-to-one communication lines (direct lines)).

FIG. 4 schematically shows one example of the configuration of various detection/measurement devices 8.

The various detection/measurement devices 8 are various sensors, etc. installed on the vehicle, and are communicably connected with the information recording ECU 6 and various ECUs 7 (ECUs 7A-1 to 7A-N, 7B-1 to 7B-M), via any communication means (e.g., CAN 9, LIN, or one-to-one communication lines (direct lines)), as shown in FIG. 1 (dotted-line arrows). As one example, various detection/measurement devices 8 include a front radar sensor 8-1, front camera sensor 8-2, ..., and an acceleration sensor 8-K. In the following description, a detection/measurement device **8-*h* (h=1, 2, ..., K) denotes any one of the detection/measurement devices 8-1 to 8-K**.

Referring back to FIG. 1, various ECUs 7 are control devices that perform vehicle control, and are ECUs that perform control associated with pre-specified types of vehicle behaviors, out of ECUs installed on the vehicle. Each of the ECUs 7 performs control associated with one or more types of vehicle behavior. The various ECUs 7 include ECUs 7A (7A-1 to 7A-N) that perform control associated with activation of driving assistance functions (optional functions) selectively installed on the vehicle (as optional equipment), and ECUs 7B (7B-1 to 7B-M) that perform control associated with vehicle behaviors other than activation of the optional functions. As one example, the ECUs 7A include PCS-ECU 7A-1, ..., LKA-ECU 7A-N. The ECUs 7B include brake ECU 7B-1, ..., engine ECU 7B-M. In the following description, ECU 7A-i (i=1, 2, ..., N) denotes any one of the ECUs 7A-1 to 7A-N. Also, ECU 7B-j (j=1, 2, ..., M) denotes any one of the ECUs 7B-1 to 7B-M.

The "vehicle behaviors other than activation of the optional functions" include vehicle behaviors caused by activation of driving assistance functions (standard functions) always installed on the vehicle (as standard equipment), and particular manipulations, and so forth. When a certain ECU 7 performs both control associated with activation of an optional function, and control associated with vehicle behavior other than activation of optional functions, this ECU 7 is handled as one of the ECUs 7A that perform control associated with activation of optional functions. PCS-ECU 7A-1 performs control associated with the function of PCS alert and the function of PCS brake (control for implementing the function of PCS alert and the function of PCS brake). LKA-ECU 7A-N performs control associated with the function of LKA (control for implementing the function of LKA). The brake ECU 7B-1 performs control associated with the function of ABS and the function of VSC (control for implementing the function of ABS and the function of VSC). The engine ECU 7B-M performs control associated with the function of TRC (control for implementing the function of TRC). Namely, in this embodiment, the following description is provided on the assumption that the functions of ABS, VSC, and TRC are standard functions, and the functions of PCS alert, PCS brake, and LKA are optional functions.

The ECU 7A-i responsive to activation of a certain optional function outputs a transmission signal corresponding to the optional function to the CAN 9 as the on-board network when this optional function is installed. The transmission signal corresponding to the optional function may be a communication frame including information indicating that the optional function is installed, in a data portion, for example. The transmission signal corresponding to the optional function may also be a transmission signal including information related to activation of the optional function, for example. In this embodiment, in CAN communications on the CAN 9, a dedicated CAN frame is set for each of the optional functions. Namely, a unique CAN-ID is assigned to each optional function. Then, the dedicated CAN frame (CAN frame including information concerning the optional function) to which the unit CAN-ID is given is transmitted, as the transmission signal corresponding to the optional function. For example, as shown in FIG. 5 (showing one example of assignment of CAN-IDs), CAN-IDs "aaa", "bbb", "ccc" are assigned to the function of LKA, and CAN-IDs "ddd", "eee", "fff" are assigned to the function of PCS alert, while CAN-IDs "ggg", "hhh", "iii" are assigned to the function of PCS brake (all of "aaa" through "iii" represent numbers in hexadecimal). When the ECU 7A-i (PCS-ECU 7A-1, LKA-ECU 7A-N) corresponding to an optional function outputs the CAN frame including information concerning the optional function to be controlled by the ECU 7A-i, to the CAN 9 (CAN bus 91, 92), the ECU 7A-i uses the unique CAN-ID corresponding to the optional function.

When the ECU 7A-i responsive to activation of an optional function outputs trigger information (which will be described later) to the CAN 9, it uses the CAN frame having the unique CAN-ID corresponding to the optional function. Namely, the CAN frame that is transmitted from the ECU 7A-i responsive to activation of the optional function to the CAN 9 and includes the trigger information corresponds to the transmission signal corresponding to the optional function. While a plurality of (three) unique CAN-IDs are assigned to each optional function, for the purpose of identifying the data content in the CAN frame, for example, in the example of FIG. 5, the unique CAN-ID assigned to each optional function may be one.

In the above manner, the ECU 7A-i responsive to activation of an optional function outputs the transmission signal corresponding to the optional function (e.g., the CAN frame having the unique CAN-ID for the optional function) onto the CAN 9. Therefore, each node of the information recording ECU 6 and various ECUs 7 (ECU 7A-1 to 7A-N, ECU 7B-1 to 7B-M) connected to the CAN 9 can determine that the corresponding optional function is installed on the vehicle.

The various ECUs 7 (ECU 7A-i, 7B-j) and the above-described various detection/measurement devices 8 (detection/measurement devices 8-1 to 8-K) realize a vehicle information creating unit that creates the above-described vehicle information. Which one of the ECUs 7 (ECU 7A-i, 7B-j) and the detection/measurement devices 8-h realizes the vehicle information creating unit is determined according the type of vehicle information specified in advance for each type of vehicle behavior to be detected (the type of vehicle information to be written). For example, when the vehicle information to be written is the acceleration of the vehicle, the vehicle information creating unit is realized by the acceleration sensor 8-K. When the vehicle information to be written is a control command value of the brake ECU 7B-1, the vehicle information creating unit is realized by the brake ECU 7B-1. The vehicle information to be written may include detection information of the front radar sensor 8-1, captured image of the front camera sensor 8-2, accelerator signal, control command value of a drive unit, the history of establishment of flags related to various controls, diagnosis information, and various conditions of an on-vehicle battery, for example.

Figure 6:
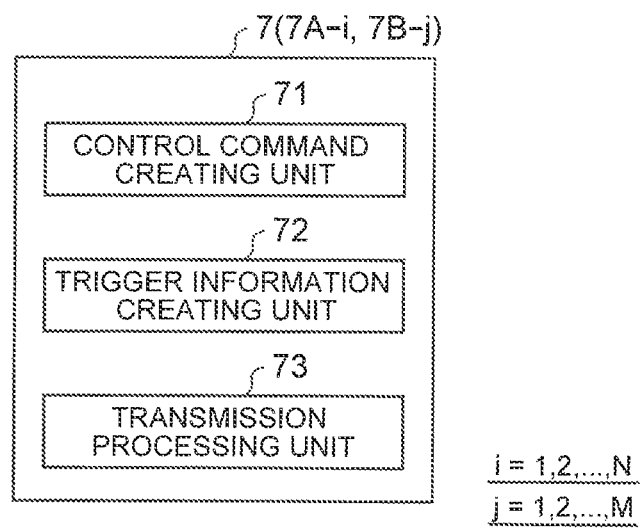
FIG. 6 is a functional block diagram of an ECU according to a first embodiment.

FIG. 6 is a functional block diagram of the ECU 7 (7A-i, 7B-j). Here, the case where the ECU 7 is PCS-ECU 7A-1 will be mainly described as one example.

The hardware configuration of the ECU 7 (7A-i, 7B-j) is similar to that of the information recording ECU 6, and therefore, will not be illustrated in the drawings. Each of the functions of the ECU 7 (7A-i, 7B-j) can be implemented by executing various programs stored in the ROM, on the CPU.

The ECU 7 (7A-i, 7B-j) includes a control command creating unit 71, a trigger information creating unit 72, and a transmission processing unit 73, as functional units realized by executing corresponding programs stored in the ROM, on the CPU.

When the ECU 7 (7A-i, 7B-j) performs control associated with two or more types of vehicle behaviors (for example, when control associated with two or more driving assistance functions is performed), the control command creating unit 71, trigger information creating unit 72, and transmission processing unit 73 are provided for each type of vehicle behavior (for each driving assistance function) to be controlled.

The control command creating unit 71 creates a control command associated with vehicle behavior (for example, a control command associated with activation of a driving assistance function, or a control command associated with activation of a fail-safe function for vehicle behavior caused by particular manipulation).

The control command creating unit 71 of the PCS-ECU 7A-1 creates a control command associated with "activation of PCS alert" and "activation of PCS brake". More specifically, the control command creating unit 71 determines whether activation of PCS alert, and activation of PCS brake are needed, based on information from the detection/measurement device 8-h. For example, the control command creating unit 71 of the PCS-ECU 7A-1 calculates a length of time (TTC: Time To Collision) it takes until the vehicle collides with an obstacle in front of the vehicle, based on detection information from at least one of the front radar sensor 8-1 and the front camera sensor 8-2. Then, when the TTC becomes equal to or less than a predetermined threshold value Tth1, the control command creating unit 71 creates an alert command, and the transmission processing unit 73 that will be described later transmits the alert command to the brake ECU 7B-1 via the transmitting/receiving part. When the TTC becomes equal to or less than Tth2 (<Tth1), the control command creating unit 71 creates an automatic brake command, and the transmission processing unit 73 transmits the automatic brake command to the brake ECU 7B-1 via the transmitting/receiving part. The brake ECU 7B-1 creates a control command, in response to receipt of the alert command, and activates an alert buzzer (activate the PCS alert). Also, the brake ECU 7B-1 creates a control command (command value), in response to receipt of the automatic brake command, and controls brake actuators including various valves, pump, accumulator, and so forth. Namely, the brake ECU 7B-1 activates the PCS brake, by increasing a wheel cylinder pressure of each wheel, based on a control value different from a control value according to braking operation of the driver.

Figure 7:
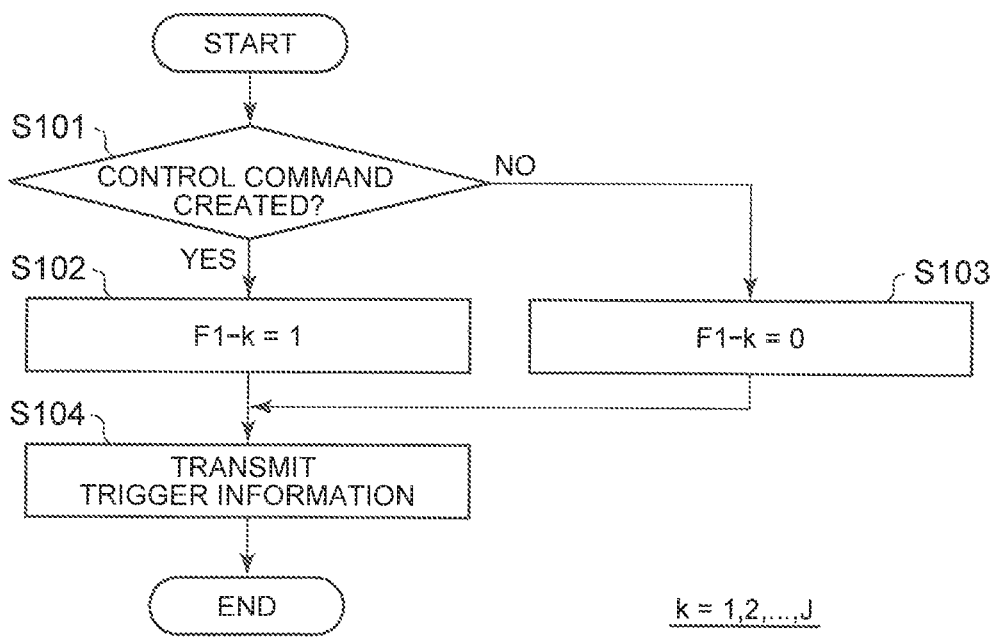
FIG. 7 is a flowchart conceptually illustrating one example of a control routine executed by a trigger information creating unit.

The trigger information creating unit 72 creates information (trigger information) concerning a trigger for recording vehicle information, in the information recording ECU 6 (data recording unit 106 that will be described later). Referring to FIG. 7, the processing flow executed by the trigger information creating unit 72 will be described.

FIG. 7 is a flowchart conceptually illustrating one example of a control routine executed by the trigger information creating unit 72. The control routine according to the flowchart of FIG. 7 is repeatedly executed at given intervals, during a period from starting to stop of the vehicle. Namely, the routine is executed at the same time that the vehicle is started, and then repeatedly executed at given intervals until the vehicle is stopped.

A trigger establishment flag F1-1-F1-J, which is provided for each of J types of vehicle behaviors to be detected, is a flag that indicates whether a trigger is established. In the following description, a trigger establishment flag F1-$k$ ($k$=1, 2, . . . , J) denotes any one of the trigger establishment flags F1-1 to F1-J. The "starting of the vehicle" means that the vehicle is brought into a state in which the vehicle is able to travel according to operation of the driver, and represents a concept including turn-on of the ignition key (IG-ON) in a gasoline engine vehicle, and start-up of a control device (e.g., HV-ECU) that performs coordinated control on the whole vehicle in an electric vehicle (including a hybrid vehicle and a range extender vehicle), for example. The "stop of the vehicle" means that the vehicle is brought into a state in which the vehicle is unable to travel according to operation of the driver, and represents a concept including turn-off of the ignition key (IG-OFF) in a gasoline engine vehicle, and stop of the above-mentioned control device in an electric vehicle, for example.

In step S101, the trigger information creating unit 72 determines whether the trigger is established, namely, whether the control command creating unit 71 has created a control command associated with control of vehicle behavior. For example, the trigger information creating unit 72 corresponding to the PCS brake of the PCS-ECU 7A-1 determines whether a control command associated with activation of PCS brake (an automatic brake command for activating the PCS brake) has been created. If the determination condition is satisfied, the trigger information creating unit 72 proceeds to step S102. If not, the trigger information creating unit 72 proceeds to step S103.

In step S102, the trigger information creating unit 72 sets a trigger establishment flag F1-$k$ to "1".

On the other hand, in step S103, the trigger information creating unit 72 sets the trigger establishment flag F1-$k$ to "0".

Then, in step S104, the trigger information creating unit 72 creates trigger information including the trigger establishment flag F1-$k$ set in step S102 or step S103, and finishes the current cycle of the routine.

Thus, the trigger information creating unit 72 creates, on a regular basis, trigger information including the trigger establishment flag F1-$k$ indicating whether or not the trigger is established, and the transmission processing unit 73 that will be described later outputs the trigger information to the CAN 9 via the transmitting/receiving part (transmits it to the information recording ECU 6 via the transmitting/receiving part and the CAN 9).

The transmission processing unit 73 performs operation to transmit the control command created by the control command creating unit 71, and the trigger information created by the trigger information creating unit 72, to a destination as an object, via the transmitting/receiving part. For example, when a controlled object is communicably connected to the ECU 7 (7A-i, 7B-j) with a direct line, the transmission processing unit 73 transmits the control command created by the control command creating unit 71, to the controlled object, via the direct line. Also, the transmission processing unit 73 outputs a CAN frame including the trigger information, to the CAN 9 via the transmitting/receiving part (transmits the CAN frame to the information recording ECU 6 via the CAN 9).

Figure 8:
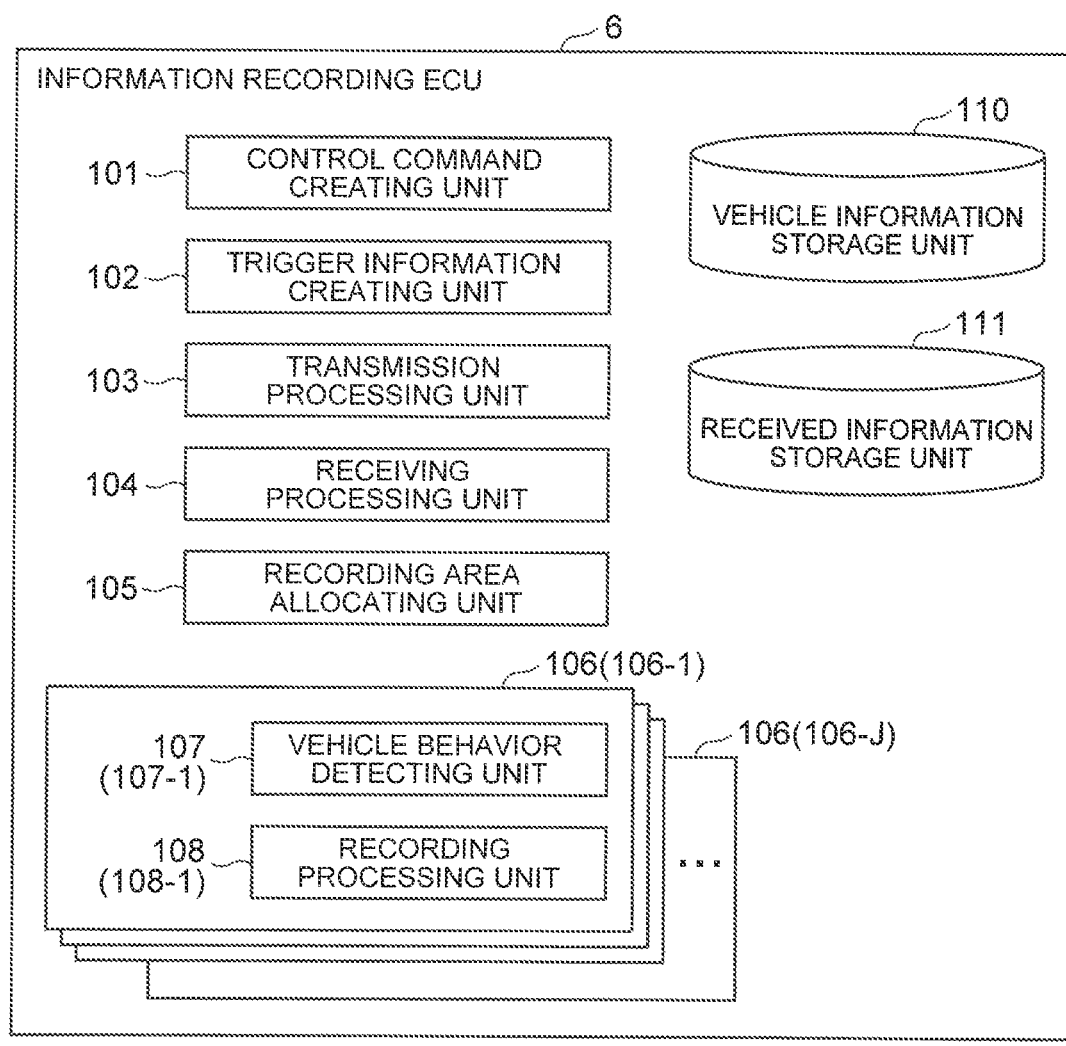
FIG. 8 is a functional block diagram of an information recording ECU according to the first embodiment.

Referring next to FIG. 8, a specific processing content of the information recording ECU 6 will be described.

FIG. 8 is a functional block diagram of the information recording ECU 6. Each of the functions excluding a vehicle information storage unit 110 and a received information storage unit 111 can be implemented by executing various programs stored in the ROM 13, on the CPU 11. The vehicle information storage unit 110 and the received information storage unit 111 are realized by storage areas specified in advance on the non-volatile memory 14.

Like the control command creating unit 71 of the ECU 7 (7A-i, 7B-j), a control command creating unit 101 creates a control command associated with a pre-specified type of vehicle behavior. However, the control command creating unit 101 creates a control command associated with a different type of vehicle behavior from those of the ECU 7 (7A-i, 7B-j). As one example, the control command creating unit 101 creates a control command associated with "activation of an occupant protection assist device (such as a seatbelt pre-tensioner)". When a pre-specified operating condition is satisfied, the control command creating unit 101 creates the control command (operating command), and a transmission processing unit 103 that will be described later transmits the control command to the occupant protection assist device via the transmitting/receiving part 25.

Like the trigger information creating unit 72 of the ECU 7 (7A-i, 7B-j), a trigger information creating unit 102 creates information (trigger information) concerning a trigger for recording vehicle information corresponding to the pre-specified type of vehicle behavior ("activation of the occupant protection assist device"). More specifically, the trigger information creating unit 102 sets a trigger establishment flag F1-J, according to the flowchart (steps S101 to S104) shown in FIG. 7, and creates trigger information including the trigger establishment flag F1-J.

The information recording ECU 6 may be arranged not to perform control associated with vehicle behavior of a type to be detected (control associated with "activation of the occupant protection assist device"). Namely, the information recording ECU 6 may be configured to specialize in operation to detect vehicle behavior of a type to be controlled by the ECU 7 (7A-i, 7B-j), and record vehicle information corresponding to the detected type of vehicle behavior. In this case, the control command creating unit 101, and the trigger information creating unit 102 are omitted.

The transmission processing unit 103 performs operation to output the control command created by the control command creating unit 101, to a destination as a controlled object, via the transmitting/receiving part.

A receiving processing unit 104 performs operation to receive a communication frame (CAN frame) from the CAN 9, via the transmitting/receiving part 25.

A recording area allocating unit 105 allocates a recording area for recording vehicle information specified in advance for each type of vehicle behavior to be detected, on the vehicle information storage unit 110, for each type of vehicle behavior to be detected. In the following description, when the conduct of allocating the recording area for recording vehicle information corresponding to the type of vehicle behavior to be detected, and such a recording area are mentioned, expressions, such as "allocating the recording area to the type of vehicle behavior to be detected", and "recording area allocated to the type of vehicle behavior to be detected", will be used, for the sake of simplicity.

The vehicle information storage unit 110 has a recording area (base recording area) that can be allocated, for each of vehicle behaviors of all types to be detected including activation of optional functions. Since the vehicle information storage unit 110 (non-volatile memory 14) may have a relative low capacity, as described above, each base recording area is often limited to a capacity that permits recording of vehicle information corresponding to the minimum necessary number of times of detection, which is specified in advance for each type of vehicle behavior to be detected. The minimum necessary number of times of detection corresponds to the number of items of data at the minimum level necessary to enable useful analysis to be performed, based on data of vehicle information recorded in the base recording area. While the minimum necessary number of times of detection can differ among the types of vehicle behaviors to be detected, it may be about five times, for example. Namely, each base recording area that can be allocated on the vehicle information storage unit 110 is often set to a capacity specified in advance for each vehicle behavior to be detected (a capacity that permits storage of vehicle information corresponding to the number of times of detection at the minimum level necessary to perform useful analysis, or a capacity obtained by adding some extra amount to this capacity). Thus, the recording area (base recording area) that can be allocated for each type of vehicle behavior to be detected is limited to the minimum necessary capacity, so that the recording area can be allocated to each of vehicle behaviors of all types to be detected, even when the vehicle information storage unit 110 has a relatively low capacity.

To the types (the number of which is L) of vehicle behaviors as activation of standard functions and vehicle behaviors caused by particular manipulations, among the types (the number of which is J) of vehicle behaviors to be detected, pre-specified recording areas RA1-1, RA1-2, ..., RA1-L (base recording areas) are respectively allocated without fail on the vehicle information storage unit 110 (L<J). For example, at the line-off stage of the vehicle, the pre-specified recording areas RA1-1, RA1-2, ..., RA1-L are respectively allocated to the types of vehicle behaviors as activation of the standard functions and vehicle behaviors caused by particular manipulations. The recording area allocating unit 105 may allocate the pre-specified recording areas RA1-1, RA1-2, ..., RA1-L to the types of vehicle behaviors as activation of the standard functions and vehicle behaviors caused by particular manipulations, when the vehicle is started for the first time. In the following description, recording area RA1-$n$ ($n$=1, 2, ..., L) denotes any one of the recording areas RA1-1 to RA1-L.

On the other hand, allocatable recording areas RA2-1, RA2-2, ..., RA2-I (base recording areas) are prepared on the vehicle information storage unit 110, for the types (the number of which is I) as activation of the optional functions (first vehicle behaviors), among the types of the vehicle behaviors to be detected, as described above. However, at the line-off stage of the vehicle or at the stage of completion of the initial starting of the vehicle, allocation of the recording areas RA2-1, RA2-2, ..., RA2-I has not been conducted. In the following description, recording area RA2-$m$ ($m$=1, 2, ..., I) denotes any one of the recording areas RA2-1 to RA2-I.

Figure 9:
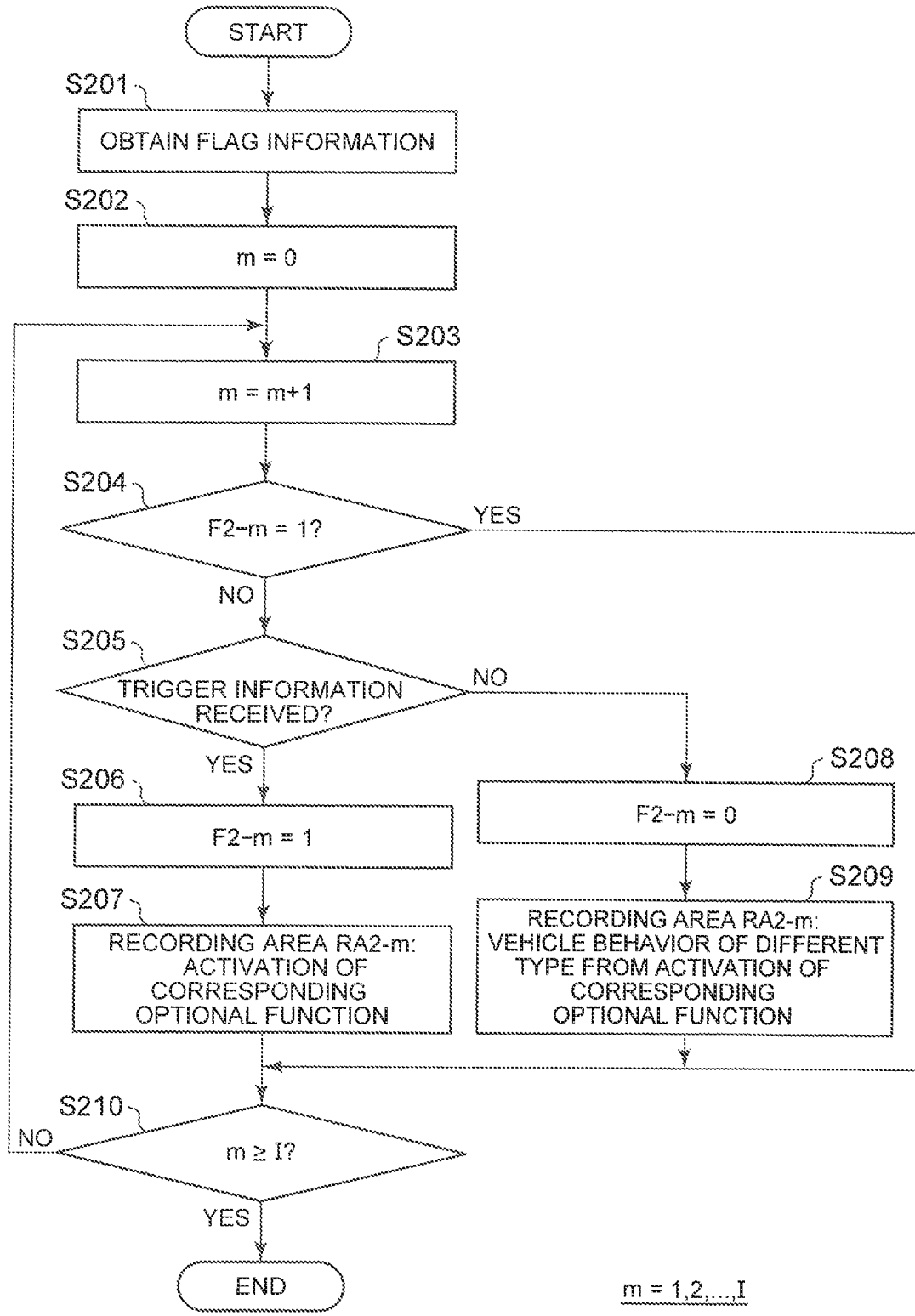
FIG. 9 is a flowchart conceptually illustrating one example of a recording area allocating routine executed by a recording area allocating unit according to the first embodiment.

The recording area allocating unit 105 performs operation as described later, to determine whether a certain optional function is installed on the vehicle, and allocates a recording area RA2-$m$ to the type of vehicle behavior as activation of the optional function for the first time, at the time when it is determined that the optional function is installed on the vehicle. When the recording area allocating unit 105 determines that a certain optional function is not installed on the vehicle, a recording area RA2-$m$ that can be allocated to activation of the optional function (first vehicle behavior) is allocated, as an additional recording area, to vehicle behavior (second vehicle behavior) of a different type from activation of the optional function. Referring to FIG. 9, the processing flow executed by the recording area allocating unit 105 will be described.

The information (recording area information) concerning the recording area allocated for each type of vehicle behavior to be detected is stored in the non-volatile memory 14, for example, and the recording area allocating unit 105 sets (updates) the recording area information, according to a control routine shown in FIG. 9. The allocation of the recording areas is realized by granting a program (application) corresponding to each recording processing unit 108 (recording processing unit 108-$k$ which will be described later) corresponding to each vehicle behavior of a type to be detected, access privilege to an address range in the non-volatile memory 14 corresponding to the recording area. Namely, the recording area allocating unit 105 allocates a certain recording area to certain vehicle behavior of a type to be detected, so as to permit the recording processing unit 108-$k$ corresponding to the vehicle behavior to record corresponding vehicle information in the recording area, and inhibit the recording processing unit 108-$k$ corresponding to a different type of vehicle behavior from recording corresponding vehicle information in the recording area.

FIG. 9 is a flowchart conceptually illustrating one example of a recording area allocating routine executed by the recording area allocating unit 105. The routine of the flowchart is executed at given intervals, during a period from starting to stop of the vehicle. Namely, the routine is executed when the vehicle is started, and then repeatedly executed at given intervals until the vehicle is stopped.

An installation flag F2-1-F2-1 is one example of received information indicating whether a transmission signal (in this embodiment, a CAN frame including trigger information) corresponding to each optional function has been received, and is a flag indicating whether each optional function is installed on the vehicle. In the following description, installation flag F2-$m$ ($m$=1, 2, ..., I) denotes any one of the installation flags F2-1 to F2-1. The installation flag F2-$m$ is set to "0", at the line-off stage of the vehicle (when the vehicle is started for the first time). The information (installation flag information) of the installation flag F2-$m$ set by the recording area allocating unit 105 is stored in the received information storage unit 111.

In step S201, the recording area allocating unit 105 obtains installation flag information (installation flags F2-1 to F2-1) stored in the received information storage unit 111.

In step S202, the recording area allocating unit 105 sets a counter value m to "0" (m=0).

In step S203, the recording area allocating unit 105 increments the counter value m (m=m+1).

In step S204, the recording area allocating unit 105 determines whether the installation flag F2-$m$ is "1", namely, whether an optional function corresponding to the current counter value m is installed. If the installation flag F2-$m$ is not "1" (if it is "0"), the recording area allocating unit 105 proceeds to step S205. If the installation flag F2-$m$ is "1", the recording area allocating unit 105 skips steps S205 to S209, and proceeds to step S210. Namely, once the installation flag F2-$m$ becomes "1", the determining operation of step S205 (which will be described later) is not performed, and the state in which the installation flag F2-$m$ is "1" (namely, the determination that the corresponding optional function is installed) is fixed or confirmed. Then, through the operation of step S206 (which will be described later), allocation of the recording area RA2-$m$ to activation of the corresponding optional function is fixed (the allocation of the recording area RA2-$m$ will not be changed).

In step S205, the recording area allocating unit 105 determines whether the receiving processing unit 104 has received a transmission signal corresponding to the optional function. In this embodiment, the ECU 7A-i responsive to activation of the optional function transmits trigger information on a regular basis, using the CAN frame having CAN-ID unique to the corresponding optional function, during a period between starting and stop of the vehicle, as described above. Therefore, if the receiving processing unit 104 receives the CAN frame including the trigger information which is regularly output to the CAN 9, the recording area allocating unit 105 can determine that the optional function corresponding to the current counter value m is installed. Namely, in step S205, the recording area allocating unit 105 determines whether the receiving processing unit 104 has received the CAN frame including the trigger information concerning activation of the optional function corresponding to the current counter value m. When the CAN frame including the trigger information is received, the recording area allocating unit 105 determines that the corresponding optional function is installed, and proceeds to step S206. On the other hand, when the CAN frame including the trigger information is not received, the recording area allocating unit 105 determines that the corresponding optional function is not installed, and proceeds to step S208.

In step S206, the recording area allocating unit 105 sets the installation flag F2-$m$ to "1" (updates the installation flag F2-$m$ stored in the received information storage unit 111).

Then, in step S207, the recording area allocating unit 105 allocates the recording area RA2-$m$ to the type of vehicle behavior as activation of the corresponding optional function (first vehicle behavior). More specifically, setting (updating) of the recording area information is performed.

On the other hand, in step S208, the recording area allocating unit 105 sets (keeps) the installation flag F2-$m$ to (at) "0".

Then, in step S209, the recording area allocating unit 105 allocates the recording area RA2-$m$, to vehicle behavior (second vehicle behavior) of a type different from the type of vehicle behavior as activation of the corresponding optional function. More specifically, setting (keeping or updating) of the recording area information is performed.

In step S210, the recording area allocating unit 105 determines whether the counter value m is equal to or larger than I as the number of types of activation of the optional functions, among the vehicle behaviors of the types to be detected. If the counter value m is equal to or larger than I, the recording area allocating unit 105 finishes the current cycle of the routine, since determination on the installation of all of the optional functions is completed. If the counter value m is smaller than I, the recording area allocating unit 105 returns to step S203, increments the counter value m, and repeats steps S204 to S210.

If a certain optional function subsequently ceases to be installed due to a failure, or the like, an external tool (tool for failure diagnosis) is connected to the CAN 9, via a DLC3 connector provided in the vehicle, for example, and a command corresponding to a reset condition is transmitted from the external tool to the information recording ECU 6, so that the installation flag F2-$m$ can be set to the initial value ("0").

Referring now to FIG. 10A to FIG. 10C, and FIG. 11A and FIG. 11B, a specific example of the operation to set recording area information (operation to allocate the recording areas) will be described.

FIG. 10A to FIG. 10C are views useful for explaining one example of the operation to allocate the recording areas (operation to set recording area information) by the recording area allocating unit 105. More specifically, assuming that the types of vehicle behaviors to be detected are 6 types (J=6), i.e., "activation of VSC", "activation of ABS", "activation of TRC", "activation of PCS alert", "activation of PCS brake", and "activation of LKA", the allocation conditions of the recording areas RA1-1 to RA1-3, and recording areas RA2-1 to RA2-3 in the vehicle information storage unit 110, which areas can be allocated for the respective types of vehicle behaviors, are shown. More specifically, FIG. 10A shows the allocation conditions of the recording areas RA1-1 to RA1-3 and recording areas RA2-1 to RA2-3, at the line-off stage of the vehicle. FIG. 10B shows the allocation conditions of the recording areas RA1-1 to RA1-3 and recording areas RA2-1 to RA2-3, in the case where it is determined that all of the functions of the PCS alert, PCS brake, and LKA as optional functions are installed on the vehicle. FIG. 10C shows the allocation conditions of the recording areas RA1-1 to RA1-3 and recording areas RA2-1 to RA2-3, in the case where it is determined that only the function of the PCS alert, among the optional functions, is installed.

In this embodiment, the information recording ECU 6 does not perform control associated with "activation of the occupant protection assist device". Namely, it is assumed that the information recording ECU 6 does not include the control command creating unit 101 and the trigger information creating unit 102.

As shown in FIG. 10A, at the line-off stage of the vehicle, the recording areas RA1-1 to RA1-3 are allocated in advance as recording areas (base recording areas) corresponding to the types of vehicle behaviors as activation of the standard functions. More specifically, the recording areas RA1-1, RA1-2, RA1-3 are allocated in advance to "activation of VSC", "activation of ABS", and "activation of TRC", respectively.

As described above, the allocation of the recording areas RA1-1 to RA1-3 to the types of vehicle behaviors may be carried out by the recording area allocating unit 105 at the time when the vehicle is started for the first time. When the vehicle behaviors to be detected include vehicle behaviors caused by particular manipulations, or the like, in addition to activation of the standard functions ("activation of VSC", "activation of ABS", and "activation of TRC"), the types of vehicle behaviors caused by the particular manipulations are handled in the same manner as the types of vehicle behaviors as activation of the standard functions. Namely, the recording areas corresponding to the types of vehicle behaviors caused by particular manipulations are allocated in advance at the line-off stage of the vehicle, or are allocated in the same manner at the time when the vehicle is started for the first time.

As shown in FIG. 10A, the recording areas RA2-1-RA2-3 as recording areas (base recording areas) that can be allocated to activation of optional functions are not allocated to any type of vehicle behavior, at the line-off stage of the vehicle.

As described above, the recording area allocating unit 105 executes the recording area allocating routine shown in FIG. 9 when the vehicle is started. For example, the recording area allocating unit 105 executes the routine of FIG. 9, after a lapse of a sufficiently longer time than the cycle of transmission of the trigger information by the ECU 7A-i corresponding to activation of the optional function, from completion of starting of the vehicle. In this manner, when the optional function is installed, the information recording ECU 6 is able to receive a transmission signal corresponding to the optional function, namely, a CAN frame including the trigger information. Therefore, in the routine of FIG. 9, the installation flag F2-$m$ corresponding to the optional function is set to "1", and the determination that the optional function is installed is fixed. Then, the recording area RA2-$m$ is allocated to the type of vehicle behavior as activation of the optional function. On the other hand, when the optional function is not installed, the information recording ECU 6 is not able to receive the transmission signal corresponding to the optional function, namely, the CAN frame including the trigger information. Therefore, in the routine of FIG. 9, the installation flag F2-$m$ corresponding to the optional function is kept at "0", and it is determined that the optional function is not installed. Then, the recording area RA2-$m$ is allocated to vehicle behavior of a different type from activation of the optional function.

As shown in FIG. 10B, if the recording area allocating unit 105 determines, upon starting of the vehicle, that all of the function of PCS alert, function of PCS brake, and the function of LKA as optional functions are installed, the unit 105 allocates respective recording areas (base recording areas) to activation of the corresponding optional functions. More specifically, the recording areas RA2-1, RA2-2, RA2-3 are allocated to "activation of LKA", "activation of PCS alert", and "activation of PCS brake", respectively.

As shown in FIG. 10C, if the recording area allocating unit 105 determines, upon starting of the vehicle, that only the function of PCS alert, among the optional functions, is installed, the unit 105 allocates the recording area RA2-2 to the "activation of PCS alert". Then, the recording areas RA2-1, RA2-3 that can be allocated to activation of the functions of PCS brake and LKA (first vehicle behaviors), which are determined as not being installed, are allocated to vehicle behaviors (second vehicle behaviors) of different types from activation of the optional functions. More specifically, the recording areas RA2-1, RA2-3 are respectively allocated as recording areas (additional recording areas) for "activation of VSC" and "activation of TRC" as activation of the standard functions.

Thus, it can be determined whether a certain optional function is installed, based on whether or not the transmission signal corresponding to the optional function has been received. Therefore, when it is determined that the optional function is not installed, the recording area RA2-*m* that can be allocated for activation of the optional function (first vehicle behavior) can be effectively utilized as a recording area (additional recording area) corresponding to a different type of vehicle behavior (second vehicle behavior).

The information recording ECU 6 may not be able to receive a transmission signal corresponding to an optional function (a CAN frame including trigger information concerning activation of the optional function) when the vehicle is started, due to a communication failure, or a difference in start-up timing between the information recording ECU 6 and the ECU 7 (7A-i, 7B-j), for example. However, since the routine of FIG. 9 is repeated during the period from starting to stop of the vehicle, as described above, the transmission signal corresponding to the optional function (CAN frame including trigger information concerning activation of the optional function) can be received, after the ECU 6 recovers from the communication failure, or the like. Accordingly, even when the CAN frames including trigger information concerning "activation of PCS brake" and "activation of LKA" cannot be received, at the time of starting of the vehicle, and allocation of the recording areas is conducted as shown in FIG. 10C, the recording area allocating unit 105 can subsequently determine that the functions of PCS brake and LKA are installed, and update the allocation of the recording areas, into the conditions shown in FIG. 10B.

Next, FIG. 11A and FIG. 11B are views useful for explaining another example of the operation to allocate the recording areas (operation to set recording area information) by the recording area allocating unit 105. Like FIG. 10A-FIG. 10C, each of FIG. 11A and FIG. 11B shows allocation conditions of the recording areas RA1-1 to RA1-3 and recording areas RA2-1 to RA2-3 in the vehicle information storage unit 110.

As shown in FIG. 11A, the recording area RA2-*m* that can be allocated for activation (first vehicle behavior) of an optional function that is determined as not being installed on the vehicle may be further divided into two or more recording areas, which may be allocated as additional recording areas for different vehicle behaviors (second vehicle behaviors). FIG. 11A shows allocation conditions of recording areas similar to those of FIG. 10C. More specifically, the recording area RA2-3 that can be allocated for "activation of TRC" is divided into recording areas RA2-3*a*, RA2-3*b*, which are allocated as additional recording areas for "activation of ABS" and "activation of TRC", respectively.

As shown in FIG. 11B, the recording area RA2-*m* that can be allocated for activation (first vehicle behavior) of an optional function that is determined as not being installed on the vehicle may be allocated for activation (second vehicle behavior) of a different type of optional function that has already been determined as being installed on the vehicle. FIG. 11B shows allocation conditions of recording areas similar to those of FIG. 10C. More specifically, the recording area RA2-3 that can be allocated for "activation of PCS brake" that is determined as not being installed on the vehicle is allocated as an additional recording area for "activation of PCS alert" that has already been determined as being installed on the vehicle. Generally, the amount of data of vehicle information that is absolutely collectable tends to be small, with respect to data of vehicle information corresponding to activation of optional functions, as compared with those for activation of standard functions and vehicle behaviors caused by particular manipulations. Thus, if the above-described allocating operation is performed, an increased amount of vehicle information corresponding to activation of the optional function that has already been determined as being installed can be collected.

Referring back to FIG. 8, the data recording unit 106 includes data recording units 106-1 to 106-J provided for respective types of vehicle behaviors to be detected. The data recording units 106-1 to 106-J include data recording units 106-1 to 106-H provided for the ECUs 7 (ECUs 7A-1 to 7A-N and ECUs 7B-1 to 7B-M), and a data recording unit 106-J provided for the information recording ECU 6 itself (H=J−1). In the following description, data recording unit 106-*k* (k=1, 2, . . . , J) denotes any one of the data recording units 106-1 to 106-J.

The data recording unit 106 includes a vehicle behavior detecting unit 107 and a recording processing unit 108. The vehicle behavior detecting unit 107 and the recording processing unit 108 respectively include vehicle behavior detecting units 107-1 to 107-J and recording processing units 108-1 to 108-J corresponding to the data recording units 106-1 to 106-J (namely, provided for respective types of vehicle behaviors to be detected). In the following description, vehicle behavior detecting unit 107-*k* denotes any one of the vehicle behavior detecting units 107-1 to 107-J. Also, recording processing unit 108-*k* denotes any one of the recording processing units 108-1 to 108-J.

The vehicle behavior detecting units 107-1-107-J, and the recording processing units 108-1-108-J have substantially the same functions, respectively, except for the types of vehicle behaviors handled. The following description is concerned with the vehicle behavior detecting unit 107-*k*, and the recording processing unit 108-*k*, unless otherwise stated.

Figure 12:
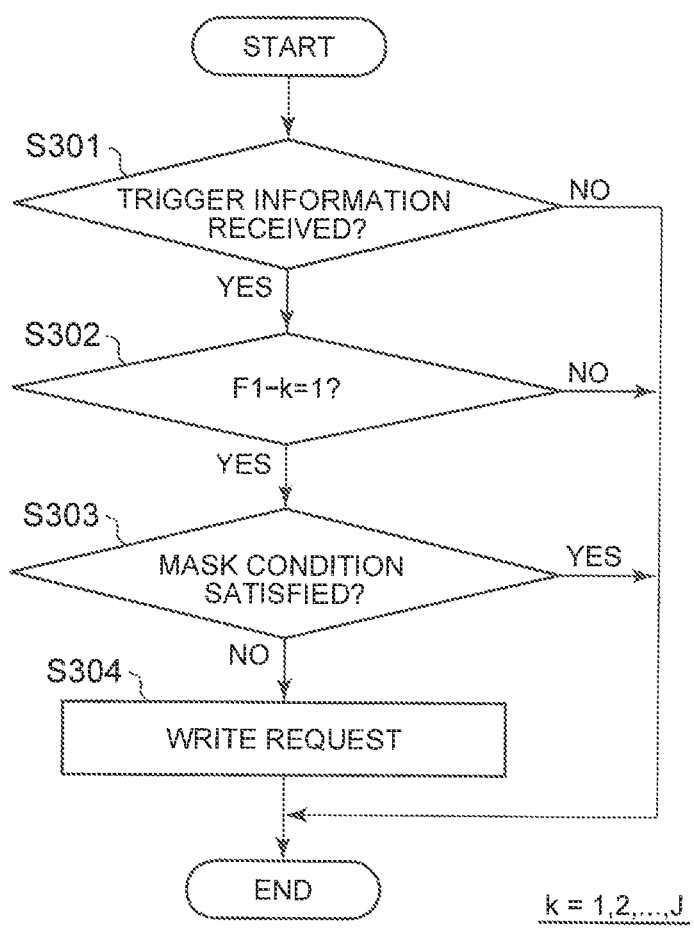
FIG. 12 is a flowchart conceptually illustrating one example of a vehicle behavior detecting routine executed by a vehicle behavior detecting unit.

The vehicle behavior detecting unit 107-*k* detects a corresponding type of vehicle behavior as a trigger for recording vehicle information, based on trigger information received from the ECU 7 (trigger information creating unit 72) via the transmitting/receiving part 25 and the CAN 9, or trigger information created by the trigger information creating unit 102. Then, except for a particular case (case where a mask condition as described later is satisfied), if the vehicle behavior detecting unit 107-*k* detects the corresponding type of vehicle behavior, it outputs a write request for recording vehicle information (vehicle information of types specified in advance for the corresponding type of vehicle behavior) at the time of detection, in the vehicle information storage unit 110. Referring next to FIG. 12, a control routine executed by the vehicle behavior detecting unit 107-$k$ will be described.

FIG. 12 is a flowchart conceptually illustrating one example of the control routine executed by the vehicle behavior detecting unit 107-$k$. The routine according to this flowchart is repeatedly executed at given intervals, during a period from starting to stop of the vehicle.

In step S301, the vehicle behavior detecting unit 107-$k$ determines whether it has received trigger information concerning the corresponding type of vehicle behavior, via the transmitting/receiving part 25. If the vehicle behavior detecting unit 107-$k$ has received the trigger information, it proceeds to step S302. If it has not received the trigger information, it finishes the current cycle of the routine.

The vehicle behavior detecting unit 107-J uses trigger information created by the trigger information creating unit 102, so as to detect "activation of the occupant protection assist device". Therefore, the vehicle behavior detecting unit 107-J may skip step S301, or may always proceed to step S302 assuming that the trigger information has been received.

In step S302, the vehicle behavior detecting unit 107-$k$ determines whether the trigger establishment flag F1-$k$ included in the trigger information concerning the corresponding type of vehicle behavior is "1". When the trigger establishment flag F1-$k$ is "1", the vehicle behavior detecting unit 107-$k$ determines that the trigger concerning the corresponding type of vehicle behavior has been established, namely, the corresponding type of vehicle behavior has been detected, and proceeds to step S303. If the trigger establishment flag F1-$k$ is not "1" (if it is "0"), the current cycle of this routine ends.

In step S303, the vehicle behavior detecting unit 107-$k$ determines whether a mask condition is satisfied. The mask condition is provided for inhibiting vehicle information that is buffered on a regular basis from being redundantly written in the vehicle information storage unit 110, as will be described later. For example, the mask condition is that "the corresponding type of vehicle behavior is successively detected, according to the routine of this flowchart", for example. If the mask condition is not satisfied, the vehicle behavior detecting unit 107-$k$ proceeds to step S304. If the mask condition is satisfied, the current cycle of the routine ends.

In step S304, the vehicle behavior detecting unit 107-$k$ outputs the write request, and finishes the current cycle of the routine.

Figure 13:
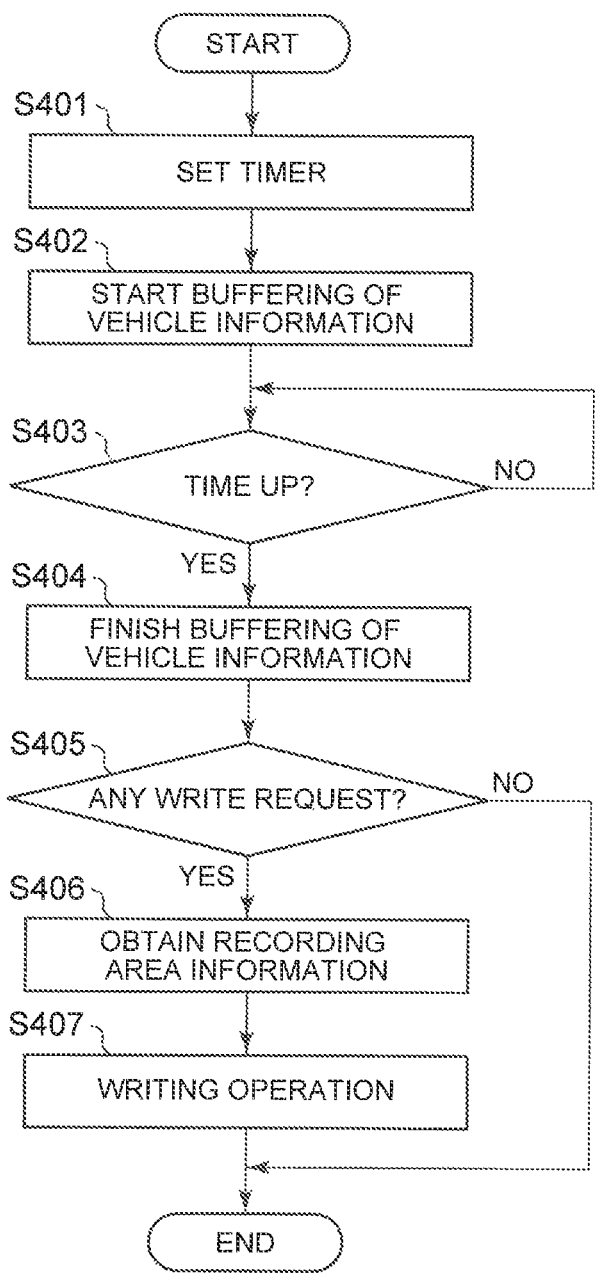
FIG. 13 is a flowchart conceptually illustrating one example of a data recording routine executed by a recording processing unit.
Figure 14:
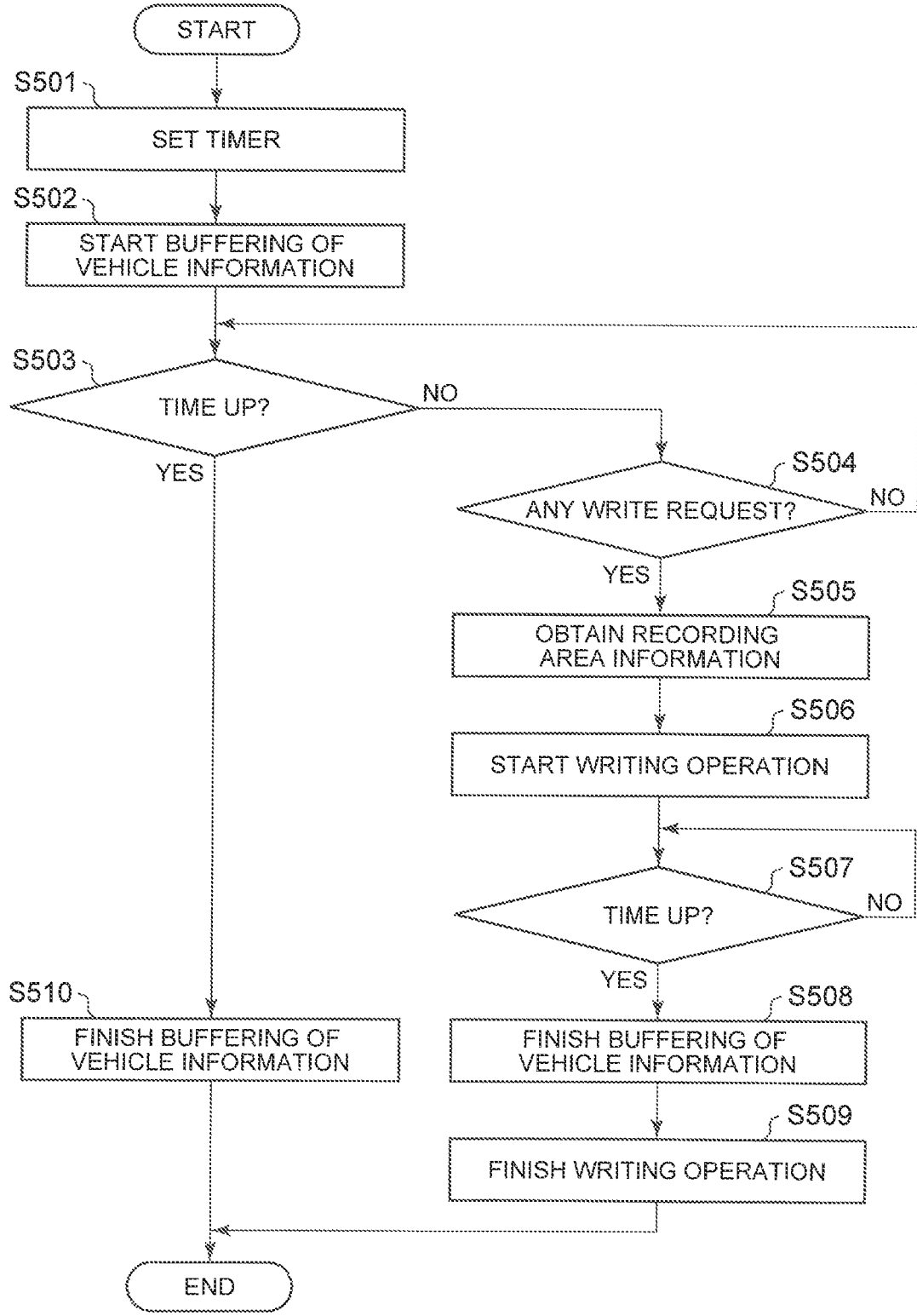
FIG. 14 is a flowchart conceptually illustrating another example of data recording routine executed by the recording processing unit.

Referring back to FIG. 8, if the vehicle behavior detecting unit 107-$k$ detects the corresponding type of vehicle behavior, the recording processing unit 108-$k$ records the corresponding vehicle information in the vehicle information storage unit 110, in a predetermined period corresponding to the time of detection. More specifically, vehicle information specified in advance for the corresponding type of vehicle behavior is buffered, in predetermined cycles, and, if a write request is generated from the vehicle behavior detecting unit 107-$k$ during the buffering, data of the vehicle information thus buffered (vehicle behavior data) is written into a recording area allocated on the vehicle information storage unit 110 (a recording area allocated by the recording area allocating unit 105, or a recording area allocated in advance at the line-off stage of the vehicle). Referring next to FIG. 13 and FIG. 14, the processing flow performed by the recording processing unit 108-$k$ will be described.

The "predetermined period corresponding to the time of detection" represents a concept including, for example, a period around (before and after) a point in time at which the corresponding type of vehicle behavior was detected, a period that starts from the time of detection, a period that ends at the time of detection, a period that starts from a point later than the time of detection, and a period that ends at a point before the time of detection. Namely, since the period of vehicle information useful for analysis may differ, depending on the type of vehicle behavior, the length, start timing, etc. of the predetermined period are specified in advance for each type of vehicle behavior. In this embodiment, when the corresponding vehicle behavior is detected during buffering performed in predetermined cycles, the corresponding data of vehicle information thus buffered is recorded, namely, vehicle information of a predetermined period around (before and after) the point in time at which the corresponding type of vehicle behavior was detected is recorded.

FIG. 13 is a flowchart conceptually illustrating one example of a data recording routine performed by the recording processing unit 108-$k$. The routine of this flowchart is executed at predetermined intervals, during a period from starting to stop of the vehicle.

In step S401, the recording processing unit 108-$k$ sets a timer.

The time set in the timer expires when a pre-specified time (recording time) T1 elapses. The recording time T1 is specified in advance for each corresponding type of vehicle behavior.

In step S402, the recording processing unit 108-$k$ starts buffering of vehicle information specified in advance for the corresponding type of vehicle behavior. The buffering of the vehicle information is conducted using a ring buffer in the RAM 12 which is set for each corresponding type of vehicle behavior.

In step S403, the recording processing unit 108-$k$ determines whether the time set in the timer expires. If the time is up, the recording processing unit 108-$k$ proceeds to step S404. If not, the recording processing unit 108-$k$ repeats execution of step S403 until the time is up.

In step S404, the recording processing unit 108-$k$ finishes buffering of vehicle information specified in advance for the corresponding type of vehicle behavior.

In step S405, the recording processing unit 108-$k$ determines whether a write request is generated from the vehicle behavior detecting unit 107-$k$ associated with the corresponding type of vehicle behavior, during buffering of vehicle information according to this routine. If the write request is generated, the recording processing unit 108-$k$ proceeds to step S406. If no write request is generated, the current cycle of the routine ends.

In step S406, the recording processing unit 108-$k$ obtains recording area information in the non-volatile memory 14.

In step S407, the recording processing unit 108-$k$ recognizes the recording area allocated to the corresponding type of vehicle behavior, based on the recording area information, and performs the operation to write data of vehicle information buffered in the ring buffer, into the recording area. Then, the current cycle of the routine ends.

Thus, according to the control routine of this flowchart, if the vehicle behavior detecting unit 107-$k$ detects the corresponding type of vehicle behavior and outputs the write request, during buffering of the vehicle information specified in advance for the corresponding type of vehicle behavior, the data of the vehicle information thus buffered is recorded into the recording area allocated on the vehicle information storage unit 110, after the end of buffering.

Next, FIG. 14 is a flowchart conceptually illustrating another example of a data recording routine performed by the recording processing unit 108-$k$. The routine of this flowchart is executed at predetermined intervals, during a period from starting to stop of the vehicle, like the routine of FIG. 13.

In step S501, the recording processing unit 108-$k$ sets a timer, as in step S401.

In step S502, the recording processing unit 108-$k$ starts buffering of vehicle information specified in advance for the corresponding type of vehicle behavior, as in step S402.

In step S503, the recording processing unit 108-$k$ determines whether the time set in the timer expires). If the time is up, the recording processing unit 108-$k$ proceeds to step S510, and finishes buffering of vehicle information specified in advance for the corresponding type of vehicle behavior, and ends the current cycle of the routine. If the time is not up, the recording processing unit 108-$k$ proceeds to step S504.

In step S504, the recording processing unit 108-$k$ determines whether a write request is generated from the vehicle behavior detecting unit 107-$k$ associated with the corresponding type of vehicle behavior. If the write request is generated, the recording processing unit 108-$k$ proceeds to step S505. If the write request is not generated, the recording processing unit 108-$k$ returns to step S503, and repeats steps S503, S504.

In step S505, the recording processing unit 108-$k$ obtains recording area information in the non-volatile memory 14.

In step S506, the recording processing unit 108-$k$ recognizes the recording area allocated to the corresponding type of vehicle behavior, based on the recording area information, and starts the operation to write data of vehicle information buffered in the ring buffer, into the recording area.

In step S507, the recording processing unit 108-$k$ determines whether the time set in the timer expires. If the time is up, the recording processing unit 108-$k$ proceeds to step S508. If not, the recording processing unit 108-$k$ repeats step S507.

In step S508, the recording processing unit 108-$k$ finishes buffering of vehicle information specified in advance for the corresponding type of vehicle behavior.

Then, in step S509, the recording processing unit 108-$k$ finishes the writing operation, and finishes the current cycle of the routine.

Thus, according to the routine of FIG. 14, if the vehicle behavior detecting unit 107-$k$ detects the corresponding type of vehicle behavior, and outputs the write request, recording of vehicle information that is being buffered in the allocated recording area on the vehicle information storage unit 110 is immediately started. In particular, in the case of vehicle behavior (such as "activation of PCS brake") of types related to collision of the vehicle, if the writing operation is performed after the end of buffering, there is a possibility that data cannot be recorded into the vehicle information storage unit 110 due to the collision during buffering. Therefore, the routine according to the flowchart of FIG. 14 is employed, so that data of vehicle information that is being buffered can be recorded with reliability.

As shown in FIG. 12, when a certain optional function is not installed on the vehicle, and trigger information (CAN frame including the trigger information) corresponding to vehicle behavior (first vehicle behavior) as activation of the optional function cannot be received, no write request is generated. Therefore, vehicle information specified in advance for activation of the optional function that is not installed on the vehicle is not recorded in the vehicle information storage unit 110, even if buffering is performed according to the routine shown in FIG. 13 or FIG. 14. Also, if the recording area allocated by the recording area allocating unit 105 for the corresponding type of vehicle behavior is filled with data of vehicle information, the recording processing unit 108-$k$ records data of vehicle information that is newly buffered, by writing the data over recorded old data of vehicle information. It is also possible to take the data of vehicle information recorded by the recording processing unit 108-$k$, to the outside of the vehicle, by connecting an external tool (tool for failure diagnosis) to the CAN 9, via a DLC3 connector, or the like, provided in the vehicle, and transmitting a command from the external tool to the information recording ECU 6, for example.

Referring next to FIGS. 15A-15D, an operation timing chart of the on-board recording system 1 according to this embodiment will be described.

Figure 15:
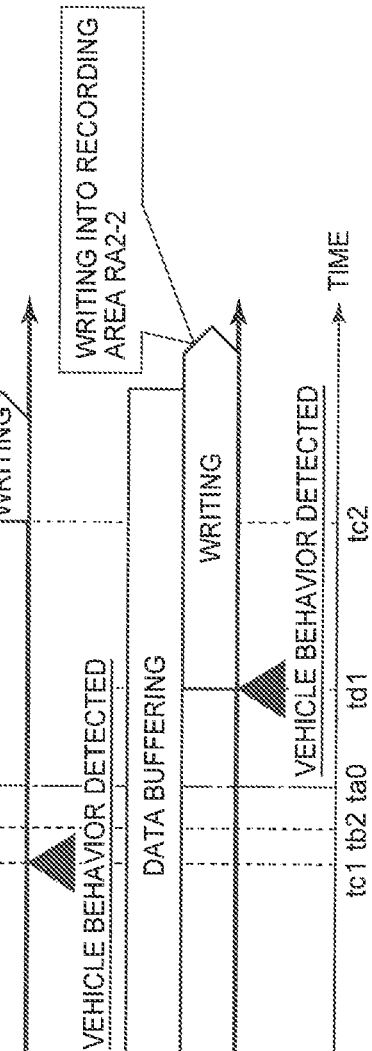
FIGS. 15A-15D are a timing chart useful for explaining an example of operation of the on-board recording system according to the first embodiment.

FIGS. 15A-15D are the operation timing chart of the on-board recording system 1 according to this embodiment. FIG. 15A (labeled as "INSTALLATION FLAG F2-1") shows change of value of an installation flag F2-1 indicating whether the PCS alert as an optional function is installed, with time. FIG. 15B (labeled as "ABS ACTIVATION") and FIG. 15C (labeled as "ABS ACTIVATION") are timing charts indicating one example and another example of processing operation of the corresponding data recording unit 106-$k$ in the case where the ABS as a standard function is activated ("activation of ABS" is detected). FIG. 15D (labeled as "PCS ALERT") is a timing chart showing one example of processing operation of the corresponding data recording unit 106-$k$ in the case where the PCS alert as an optional function is activated ("activation of the PCS alert" is detected).

In this example, it is assumed that the information recording ECU 6 (receiving processing unit 104) failed to receive a CAN frame including trigger information concerning "activation of PCS alert", which frame is generated from the PCS-ECU 7A-1 (its trigger information creating unit 72) to the CAN 9, when the vehicle started, because of a communication failure, or a difference in start-up timing between the information recording ECU 6 and various ECUs 7. It is also assumed that the recording area allocating unit 105 allocates the recording areas for "activation of ABS" and "activation of PCS alert", by the methods shown in FIG. 10A to FIG. 10C. It is also assumed that the operation to write vehicle information corresponding to "activation of ABS" is performed by executing the routine according to the flowchart shown in FIG. 13, and the operation to write vehicle information corresponding to "activation of PCS alert" is performed by executing the routine according to the flowchart shown in FIG. 14.

As shown in FIG. 15A "INSTALLATION FLAG F2-1", in this example, the recording area allocating unit 105 receives a transmission signal corresponding to the PCS alert (a CAN frame including trigger information concerning "activation of PCS alert") at time ta0, and the installation flag F2-1 indicating whether or not the PCS alert is installed is updated from "0" to "1". As a result, the recording area allocating unit 105 determines that the function of the PCS alert is installed; therefore, after time ta0, the recording area RA2-2 is allocated for "activation of PCS alert" (see FIG. 9, and FIG. 10A to FIG. 10C).

In one example shown in FIG. 15B "ABS ACTIVATION", the vehicle behavior detecting unit 107-$k$ detects "activation of ABS", at time tb1 before time ta0. Then, after the end of buffering of corresponding vehicle information, the corresponding recording processing unit 108-$k$ starts the operation to write the buffered vehicle information, at time tb2 before time ta0. Before time ta0, the recording area allocating unit 105 determines that the function of PCS alert is not installed, and sets recoding area information; therefore, the recording processing unit 108-$k$ writes buffered vehicle information in the recording area RA1-2 or the recording area RA2-2. Thus, when the recording area allocating unit 105 determines that the function of PCS alert is not installed, the recording area RA2-2 that can be allocated for "activation of PCS alert" is allocated as an additional recording area for "activation of ABS" of a different type from "activation of PCS alert". Therefore, even in a situation where the recording area RA1-2 as the base recording area is full, for example, it is possible to record the buffered vehicle information in the recording area RA2-2, without overwriting, and an increased volume of data of corresponding vehicle information can be recorded.

On the other hand, in another example shown in FIG. 15C "ABS ACTIVATION", the vehicle behavior detecting unit 107-$k$ detects "activation of ABS", at time tc1 before time ta0. Then, after the end of buffering of the corresponding vehicle information, the recording processing unit 108-$k$ starts the operation to write the buffered vehicle information, at time tc2 after time ta0. After time ta0, the recording area allocating unit 105 determines that the function of the PCS alert is installed, and sets the recording area information; therefore, the recording processing unit 108-$k$ writes buffered vehicle information in the recording area RA1-2 as the base recording area. Also, as shown in FIG. 15D "PCS ALART", if the vehicle behavior detecting unit 107-$k$ detects "activation of PCS alert", after time ta0, the recording processing unit 108-$k$ can write vehicle information corresponding to "activation of PCS alert" into the recording area RA2-2, since the recording area RA2-2 is already allocated for "activation of PCS alert".

Thus, when the recording area allocating unit 105 determines that the function of PCS alert is installed, it allocates the recording area RA2-2 exclusively for "activation of PCS alert". Namely, when the recording area allocating unit 105 determines that the PCS alert is installed, it permits vehicle information corresponding to "activation of PCS alert" to be recorded in the dedicated recording area RA2-2, and inhibits vehicle information corresponding to a different type of vehicle behavior ("activation of ABS") from being recorded in the recording area RA2-2. Accordingly, after the determination of the installation of the PCS alert, only the vehicle information corresponding to "activation of PCS alert" is recorded in the recording area RA2-2; therefore, the reliability of data of vehicle information (vehicle behavior data) recorded in correspondence with "activation of PCS alert" can be assured. Also, as shown in FIG. 15C "ABS ACTIVATION", even if the installation flag F2-1 is "0" when "activation of ABS" is detected, the recording area allocating unit 105 does not permit (inhibits) the vehicle information corresponding to "activation of ABS" to be (from being) recorded in the recording area RA2-2 that can be allocated for "activation of PCS alert", if the installation flag F2-1 is "1" when the corresponding vehicle information is recorded (when the writing operation is started). Thus, the reliability of data of vehicle information corresponding to activation of the optional function ("activation of PCS alert") recorded in the base recording area (recording area RA2-2) can be more appropriately assured. Namely, the determination as to whether the optional function is installed on the vehicle is fixed or confirmed, not at the time when the second vehicle behavior ("activation of ABS") is detected, but the time when the corresponding vehicle information is actually recorded. With this arrangement, in the case where the transmission signal corresponding to the optional function cannot be received, due to a communication failure, for example, vehicle information corresponding to the second vehicle behavior different from activation of the optional function is less likely or unlikely to be recorded in the recording area that can be allocated for the optional function.

In a condition where vehicle information corresponding to "activation of ABS" is recorded in the recording area RA2-2, for example, the recording area allocating unit 105 may determine that the function of PCS alert is installed, and may allocate the recording area RA2-2 to "activation of PCS alert". In this case, if the vehicle behavior detecting unit 107-$k$ detects "activation of PCS alert", the corresponding recording processing unit 108-$k$ writes buffered data of vehicle information, initially into an area in which vehicle information corresponding to "activation of ABS" has not been recorded. If the recording area RA2-2 becomes full, overwriting is performed on data of vehicle information corresponding to "activation of ABS". Also, in one example of FIG. 15B "ABS ACTIVATION", the recording processing unit 108-$k$ corresponding to "activation of ABS" may record the corresponding data of vehicle information buffered, over the recording areas RA1-2, RA2-2, for example. Namely, the recording processing unit 108-$k$ corresponding to "activation of ABS" records the corresponding vehicle information, in at least one of the base recording area and the additional recording area.

In the above-described embodiment, the ECU 7A-$i$ (its transmission processing unit 73) corresponding to activation of an optional function outputs a transmission signal corresponding to the optional function (a CAN frame having a CAN-ID uniquely assigned to the optional function, the CAN frame including trigger information concerning activation of the optional function), to the on-board network, via the transmitting/receiving part. Then, the information recording ECU 6 (receiving processing unit 104) receives the transmission signal, so as to determine whether the optional function is installed. More specifically, the recording area allocating unit 105 determines whether the transmission signal is received, so as to determine whether the optional function is installed, and sets the installation flag F2-1-F2-1 as received information indicating whether the transmission signal is received. When the installation flag F2-$m$ indicates that the transmission signal has been received (namely, the flag is "1"), the recording area allocating unit 105 allocates a base recording area (first area) on the vehicle information storage unit 110 for activation of the corresponding optional function (first vehicle behavior). Namely, the vehicle information (first vehicle information) corresponding to activation of the optional function is permitted to be recorded in the first area (base recording area) in the vehicle information storage unit 110, and the vehicle information (second vehicle information) corresponding to vehicle behavior (second vehicle behavior) of a type different from the optional function is permitted to be recorded in the second area (base recording area), while the second vehicle information is inhibited from being recorded in the first area. On the other hand, when the installation flag F2-$m$ indicates that the transmission signal has not been received (namely, the flag is "0"), the recording area allocating unit 105 allocates a recording area (first area) that can be allocated for activation of the corresponding optional function, as an additional recording area for a different type of vehicle behavior (second vehicle behavior). Namely, when the second vehicle behavior is detected by the vehicle behavior detecting unit 107-*k*, the vehicle information (second vehicle information) corresponding the second vehicle behavior is permitted to be recorded in the recording area (first area) that can be allocated for activation of the optional function, in addition to the base recording area (second area). In this manner, when an optional function is not installed on the vehicle, the recording area (first area) that can be used for recording vehicle information corresponding to activation of the optional function (first vehicle behavior) can be utilized as an additional recording area for recording vehicle information corresponding to another type of vehicle behavior (second vehicle behavior). In particular, since the vehicle information storage unit 110 (non-volatile memory 14) is likely to have a relatively low capacity, as described above, the base recording area that can be allocated for each vehicle behavior of types to be detected is often limited to the minimum level of capacity at least needed for useful analysis. Accordingly, if the recording area corresponding to vehicle behavior (second vehicle behavior) of a type different from activation of the optional function is expanded, the usefulness of the analysis on the second vehicle behavior can be further enhanced.

When an optional function is installed, vehicle information corresponding to the first vehicle behavior as activation of the optional function, and vehicle information corresponding to the second vehicle behavior of a type different from the first vehicle behavior are respectively recorded in different recording areas (first area and second area) on the vehicle information storage unit 110. Therefore, the reliability of data of vehicle information corresponding to activation of the optional function (first vehicle behavior) can be assured.

In this embodiment, in the framework of the CAN 9 as an on-board network widely installed on vehicles, a transmission signal can be realized only by assigning a unique CAN-ID to each driving assistance function. Therefore, increase of the cost of the on-board recording system as a whole can be suppressed.

Next, a second embodiment will be described.

The on-board recording system 1 according to this embodiment is mainly different from that of the first embodiment, in that the trigger information creating unit 72 in the ECU 7 (7A-i, 7B-j) is omitted, and that processing performed by the information recording ECU 6 (the recording area allocating unit 105, the vehicle behavior detecting unit 107) is different.

Initially, the configuration of the ECU 7 (7A-i, 7B-j) according to this embodiment will be described.

As described above, the ECU 7 (7A-i, 7B-j) according to this embodiment does not include the trigger information creating unit 72 shown in FIG. 6, in contrast to the first embodiment.

The control command creating unit 71 creates a control command associated with vehicle behavior (a control command for activating a driving assistance function), as in the first embodiment.

Figure 16:
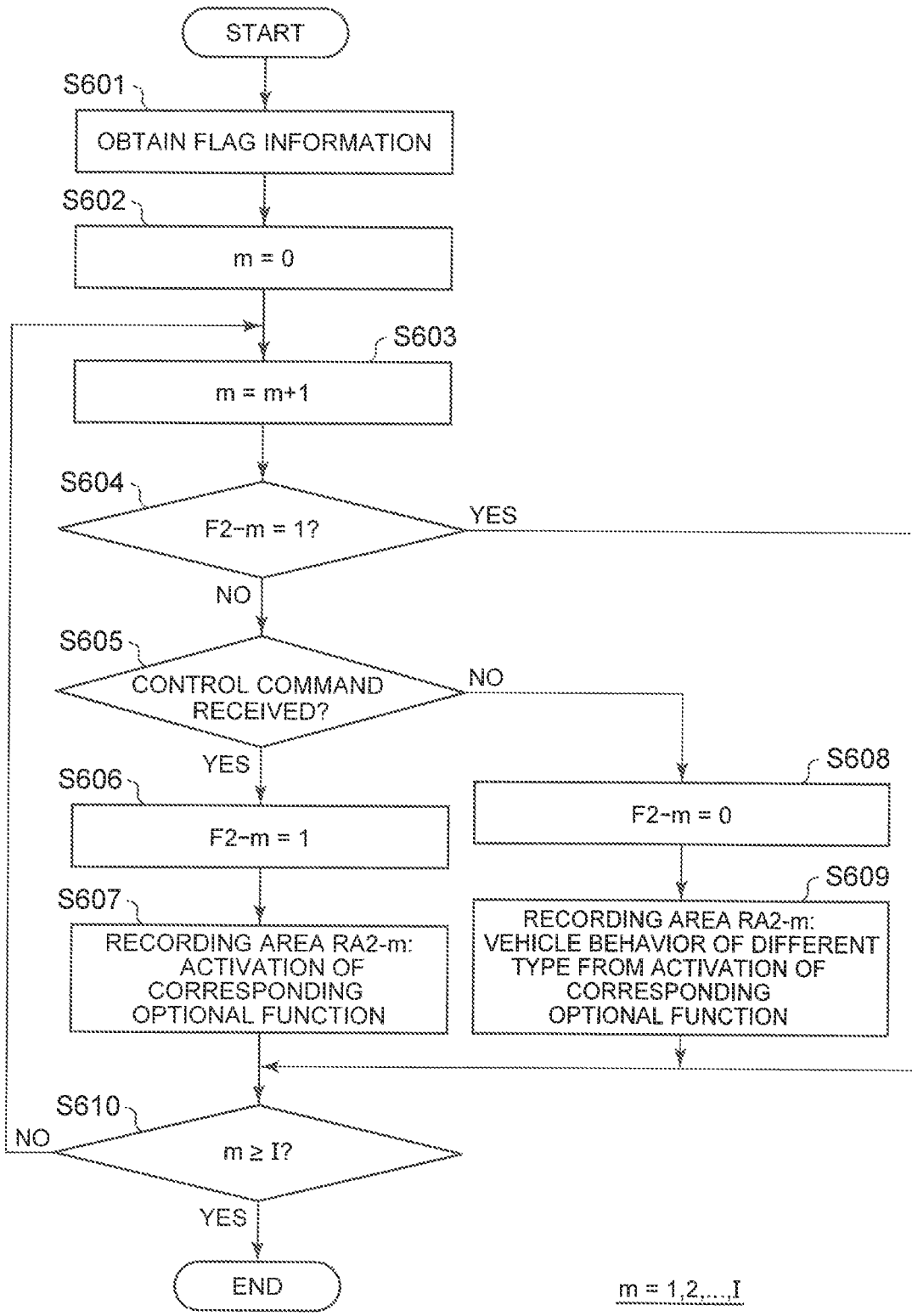
FIG. 16 is a flowchart conceptually illustrating one example of a recording area allocating routine executed by a recording area allocating unit according to a second embodiment.

The transmission processing unit 73 transmits the control command created by the control command creating unit 71, to a controlled object as a destination, via a transmitting/receiving part, and also outputs the control command to the CAN 9. When the ECU 7A-i responsive to activation of an optional function outputs a control command associated with activation of the optional function, it uses a CAN frame having a CAN-ID uniquely assigned to the optional function. Namely, the control command associated with activation of the optional function corresponds to the transmission signal corresponding to the optional function. Therefore, the recording area allocating unit 105 can determine whether the optional function is installed on the vehicle, when the receiving processing unit 104 receives the control command as the transmission signal corresponding to the optional function, via the transmitting/receiving part 25. Referring next to FIG. 16, the flow of a recording area allocating routine (routine of setting recording area information) executed by the recording area allocating unit 105 will be described.

When the controlled object and the ECU 7 (7A-i, 7B-j) are connected via the CAN 9 such that they can communicate with each other, the control command created by the control command creating unit 71 is generated to the CAN 9 via the transmitting/receiving part (and transmitted to the controlled object via the CAN 9).

FIG. 16 is a flowchart conceptually illustrating one example of recording area allocating routine (routine for setting recording area information) executed by the recording area allocating unit 105. The routine according to the flowchart of FIG. 16 is executed at predetermined intervals, during a period from starting to stop of the vehicle, as in the first embodiment (FIG. 9). Namely, the routine is executed when the vehicle is started, and then, repeatedly executed at predetermined intervals until the vehicle is stopped.

The processing of steps S601 to S604, and steps S606 to S610, in the flowchart of FIG. 16 is substantially the same as that of steps S201 to S204, and steps S206 to S210 in FIG. 9, and therefore, will not be explained herein.

In step S605, the recording area allocating unit 105 determines whether the receiving processing unit 104 has received a transmission signal corresponding to an optional function. In this embodiment, as described above, the ECU 7A-i responsive to activation of an optional function transmits a control command associated with activation of the optional function, using a CAN frame having a CAN-ID unique to the corresponding optional function. Namely, the ECU 7A-i transmits the control command for activating the optional function. Therefore, when the receiving processing unit 104 receives the CAN frame as the control command associated with activation of the optional function, the recording area allocating unit 105 can determine that the optional function corresponding to the current counter value m is installed. Namely, in step S605, the recording area allocating unit 105 determines whether the receiving processing unit 104 has received the CAN frame as the control command associated with activation of the optional function corresponding to the current counter value m. If the recording area allocating unit 105 has received the CAN frame as the control command, it determines that the corresponding optional function is installed, and proceeds to step S606. On the other hand, if the recording area allocating unit 105 has not received the CAN frame, it determines that the corresponding optional function is not installed, and proceeds to step S608.

Thus, the control command for activating the driving assistance function is also used as the transmission signal corresponding to the optional function, for determining whether the optional function is installed. Thus, as compared with the case where a dedicated transmission signal is provided, the cost of the on-board recording system as a whole can be reduced, and the processing load of the ECU 7A-i responsive to activation of the optional function can be reduced.

The ECU 7 (7A-i, 7B-j) may output a notice to the effect that a control command has been created, to the CAN 9, in place of the control command itself. Namely, when the ECU 7A-i responsive to activation of an optional function outputs a CAN frame that informs that a control command associated with activation of the optional function has been created, to the CAN 9, too, it uses the CAN-ID uniquely assigned to the optional function. Therefore, the notice as described above also corresponds to the transmission signal corresponding to the optional function.

Referring next to FIG. 17A and FIG. 17B, a specific example of the recording area allocating routine (routine for setting recording area information) executed by the recording area allocating unit 105 according to this embodiment will be described.

FIG. 17A and FIG. 17B are views useful for explaining one example of the recording area allocating routine (routine for setting recording area information) executed by the recording area allocating unit 105 according to this embodiment. More specifically, as in FIG. 10A to FIG. 10C of the first embodiment, assuming that the types of vehicle behaviors to be detected are 6 types (J=6), i.e., "activation of VSC", "activation of ABS", "activation of TRC", "activation of PCS alert", "activation of PCS brake", and "activation of LKA", allocation conditions of the recording areas RA1-1 to RA1-3, and recording areas RA2-1 to RA2-3, in the vehicle information storage unit 110, which areas can be allocated for the respective types of the above vehicle behaviors, are shown in FIG. 17A and FIG. 17B. More specifically, FIG. 17A shows the allocation conditions of the recording areas RA1-1 to RA1-3 and the recording areas RA2-1-RA2-3 at the line-off stage of the vehicle. FIG. 17B shows the allocation conditions of the recording areas RA1-1 to RA1-3 and the recording areas RA2-1 to RA2-3 in the case where the PCS alert as an optional function is activated.

As shown in FIG. 17A, at the line-off stage of the vehicle, the recording areas RA1-1 to RA1-3 are allocated in advance as recording areas (base recording areas) corresponding to vehicle behaviors as activation of the standard functions, as in FIG. 10A of the first embodiment. More specifically, the recording areas RA1-1, RA1-2, and RA1-3 are allocated in advance to "activation of VSC", "activation of ABS", and "activation of TRC", respectively. Unlike the first embodiment, the recording areas RA2-1-RA2-3 as recording areas (base recording areas) that can be allocated for activation of optional functions are allocated in advance as additional recording areas for the types of vehicle behaviors as activation of the standard functions, at the line-off stage of the vehicle. More specifically, the recording areas RA2-1, RA2-2, and RA2-3 are allocated in advance to "activation of VSC", "activation of ABS", and "activation of TRC", respectively.

The allocation of the recording areas RA1-1 to RA1-3 and the recording areas RA2-1 to RA2-3 to the types of vehicle behaviors may be carried out by the recording area allocating unit 105, when the vehicle is started for the first time.

As described above, in this embodiment, a control command that is created by the ECU 7A-i responsive to activation of an optional function and generated to the CAN 9 (control command associated with activation of the optional function) corresponds to a transmission signal corresponding to the optional function. Namely, at the time when the optional function is activated for the first time, since line-off of the vehicle, the control command is generated to the CAN 9, for the first time. Thus, the recording area allocating unit 105 can determine that the optional function is installed, when the receiving processing unit 104 receives the control command, via the transmitting/receiving part 25.

As shown in FIG. 17B, if the corresponding vehicle behavior detecting unit 107-k detects "activation of PCS alert" after the vehicle is started for the first time, the recording area allocating unit 105 allocates the recording area RA2-2 for "activation of PCS alert", at substantially the same time.

Thus, until the control command is generated to the on-board network, namely, until the optional function is activated, the information recording ECU 6 (receiving processing unit 104) does not receive the control command as the transmission signal corresponding to the optional function, and the recording area allocating unit 105 does not determine that it has received the control command; therefore, the installation flag F2-m (installation flag information) indicating that the transmission signal corresponding to the optional function (CAN frame as the control command associated with activation of the optional function) has not been received is stored in the received information storage unit 111. Therefore, even in the case where the optional function is installed, the recording area (first area) for recording vehicle information corresponding to the first vehicle behavior as activation of the optional function can be effectively utilized as a recording area (additional recording area) for recording vehicle information corresponding to the second vehicle behavior different from the first vehicle behavior, until the optional function is activated.

As in the first embodiment (FIG. 11A), the recording area that can be allocated for activation of the optional function that is determined as not being installed on the vehicle (first vehicle behavior) may be divided into two or more recording areas, which may be allocated as additional recording areas for two or more different vehicle behaviors (second vehicle behaviors).

As in the first embodiment (FIG. 11B), the recording area that can be allocated for activation of the optional function that is determined as not being installed on the vehicle (first vehicle behavior) may be allocated for activation of a different type of optional function that has already been determined as being installed on the vehicle (first vehicle behavior).

Figure 18:
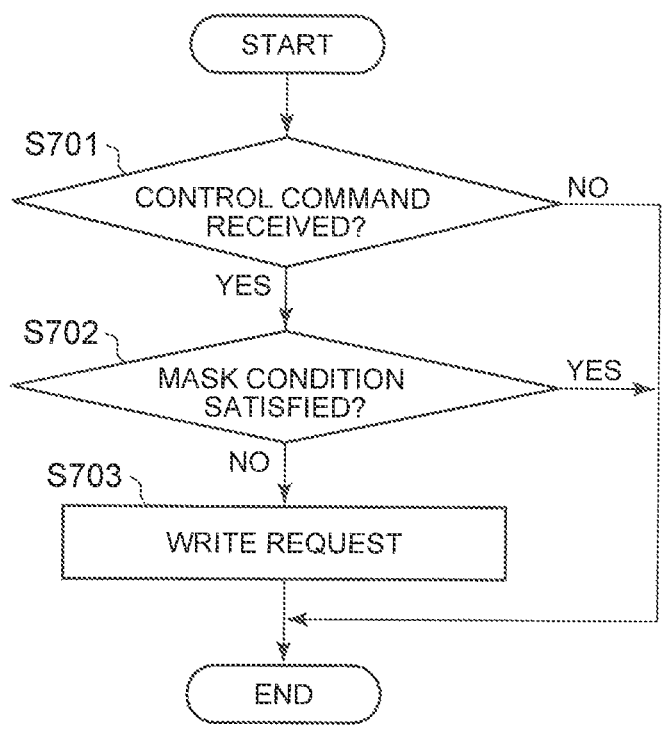
FIG. 18 is a flowchart conceptually illustrating one example of a vehicle behavior detecting routine executed by a vehicle behavior detecting unit according to the second embodiment.

Referring next to FIG. 18, the processing flow of the vehicle behavior detecting unit 107-k will be described. As in the first embodiment (see FIG. 12), the control routine according to the flowchart of FIG. 18 is repeatedly executed at predetermined intervals, during a period from starting to stop of the vehicle.

Steps S702, S703 in FIG. 18 are substantially the same as steps S303, S304 in FIG. 12, and therefore, will not be explained herein.

In step S701, the vehicle behavior detecting unit 107-k determines whether the receiving processing unit 104 has received a control command associated with the corresponding type of vehicle behavior, via the transmitting/receiving part 25. If the control command is received, the vehicle behavior detecting unit 107-k determines that the corresponding vehicle behavior has been detected, and proceeds to step S702. If the control command is not received, the current cycle of the routine ends.

Thus, in this embodiment, the corresponding type of vehicle behavior can be detected, based on whether the control command has been received.

While the embodiments of the invention have been described in detail, this invention is not limited to these particular embodiments, but may be subjected to various modifications or changes, within the range of the principle of the invention described in the appended claims.

For example, while the information recording ECU 6 as a recording device, and various ECUs as control devices that perform control associated with the optional functions, are connected via the CAN in the above-described embodiment, they may be connected via another type of on-board network, such as Flexray, or LIN. Namely, no matter what communication protocol is used, any type of on-board network may be employed provided that a control device (transmitter) that performs control associated with activation of an optional function outputs a transmission signal corresponding to the optional function to the on-board network, and a recording device (receiver) is able to receive the transmission signal.

The transmission signal that corresponds to an optional function and is generated by the ECU 7A-i responsive to activation of the optional function may be transmitted, in response to a request from the information recording ECU 6. For example, when the vehicle is started, the information recording ECU 6 may output a signal (request signal) that requests the ECU 7A-i responsive to activation of the optional function to transmit the transmission signal corresponding to the optional function, to the CAN 9, and the ECU 7A-i responsive to activation of the optional function may transmit the transmission signal corresponding to the optional function, in response to the request signal received via the CAN 9. With this arrangement, the recording area allocating unit 105 can determine whether the optional function is installed when the vehicle is started, and perform the operation to allocate recording areas, in the same manner as in the first embodiment.

In connection with the embodiments as described above, the following embodiments will be further disclosed.

Embodiment 1

An on-board recording system includes a control device that performs vehicle control including control associated with a driving assistance function selectively installed on a vehicle, and a recording device that is communicably connected to the control device via an on-board network, and records vehicle information representing a state of the vehicle when any of pre-specified types of vehicle behaviors is detected. The vehicle information is specified in advance for each of the pre-specified types of vehicle behaviors, and is obtained in a predetermined period corresponding to a time of detection at which the vehicle behavior is detected. In the on-board recording system, the control device includes a transmitting unit that outputs a transmission signal to the on-board network in a case where the driving assistance function is installed on the vehicle, and the recording device includes a receiving unit that receives the transmission signal, a determining unit that determines whether the receiving unit has received the transmission signal, a received information storage unit that stores a result of determination by the determining unit, as received information, a vehicle information storage unit that includes a recording area that is set for each type of the vehicle behaviors, and has a capacity that permits recording of the vehicle information for a pre-specified number of detection for each type of the vehicle behaviors, a first vehicle behavior detecting unit that detects a first vehicle behavior as activation of the driving assistance function, among the vehicle behaviors, a second vehicle behavior detecting unit that detects a second vehicle behavior of a different type from the first vehicle behavior, among the vehicle behaviors, a first recording processing unit that records first vehicle information as the vehicle information corresponding to the first vehicle behavior, in a first area as the recording area corresponding to the first vehicle behavior, when the first vehicle behavior detecting unit detects the first vehicle behavior, a second recording processing unit that records second vehicle information as the vehicle information corresponding to the second vehicle behavior, in at least one of the first area, and a second area as the recording area corresponding to the second vehicle behavior, when the second vehicle behavior detecting unit detects the second vehicle behavior, a recording permitting unit that permits the first recording processing unit to record the first vehicle information in the first area, and permits the second recording processing unit to record the second vehicle information in the second area, while inhibiting the second recording processing unit from recording the second vehicle information in the first area, when the received information indicates that the transmission signal has been received, and permits the second recording processing unit to record the second vehicle information in the first area and the second area, when the received information indicates that the transmission signal has not been received.

Embodiment 2

In the on-vehicle recording system described in the embodiment 1, when the determining unit determines that the receiving unit has received the transmission signal, the determining unit does not subsequently determine whether the receiving unit has received the transmission signal.

According to the embodiment 2, once the determining unit of the recording device determines that the receiving unit has received the transmission signal, it does not subsequently make the determination. Namely, the received information stored in a second storage unit is not updated, after the result of determination that the receiving unit has received the transmission signal is reflected. Therefore, it is possible to avoid a situation where the received information is updated for some reason, and received information that does not reflect the result of determination that the receiving unit has received the transmission signal (received information indicating that the transmission signal has not been received) is stored in the received information storage unit. Namely, even if the received information is updated into a content indicating that the transmission signal has not been received, after the content of the received information once indicates the transmission signal has been received, and it is determined that the driving assistance function (optional function) as optional equipment is installed, and the first vehicle behavior detecting unit detects the first vehicle behavior as activation of the optional function, it is possible to curb occurrence of a situation where the first vehicle information corresponding to the first vehicle behavior cannot be recorded in the first area, since the content of the received information indicates that the transmission signal has not been received. Namely, it is possible to curb failure to record vehicle information corresponding to vehicle behavior as activation of the optional function.

Embodiment 3

In the on-vehicle recording system described in the embodiment 1 or 2, the transmitting unit repeatedly transmits the transmission signal, during a period from starting to stop of the vehicle, and the determining unit repeatedly determines whether the receiving unit has received the transmission signal, during the period from starting to stop of the vehicle.

According to the embodiment 3, the transmitting unit of the control device repeatedly outputs the transmission signal to the on-vehicle network, during the period from starting to stop of the vehicle. Then, the determining unit of the recording device repeatedly determines whether the receiving unit has received the transmission signal, during the period from starting to stop of the vehicle. Therefore, even in the case where the receiving unit cannot receive the transmission signal transmitted at the time when the vehicle is started for the first time (including the first time after the optional function is additionally installed), due to a communication failure of the on-board network, or the like, the receiving unit can subsequently receive the transmission signal transmitted after recovery from the communication failure, and the determining unit can determine that the receiving unit has received the transmission signal. Namely, the receiving unit receives any of the transmission signals that are repeatedly generated, and the determining unit determines that the receiving unit has received any of the transmission signals while repeatedly determining whether the transmission signal has been received, so that the received information to the effect that the transmission signal has been received is stored in the received information storage unit. Thus, it is possible to curb occurrence of a situation where the first vehicle information corresponding to the first vehicle behavior cannot be recorded in the first area within the vehicle information storage unit, since the content of the received information indicates that the transmission signal has not been received, even if the first vehicle behavior detecting unit detects the first vehicle behavior as activation of the optional function. Namely, it is possible to curb failure to record vehicle information corresponding to vehicle behavior as activation of the optional function.

Embodiment 4

In the on-board recording system described in any one of the embodiments 1 through 3, even in the case where the received information indicates that the transmission signal has not been received when the second vehicle behavior detecting unit detects the second vehicle behavior, the recording permitting unit inhibits the second recording processing unit from recording the second vehicle information in the first area, in the case where the received information indicates that the transmission signal has been received, when the second recording processing unit records the second vehicle information in the vehicle information storage unit according to the detection.

According to the embodiment 4, even if the received information indicates that the transmission signal has not been received when the second vehicle behavior detecting unit detects the second vehicle behavior, the recording permitting unit inhibits the second recording processing unit from recording the second vehicle information corresponding to the second vehicle behavior in the first area, if the received information indicates that the transmission signal has been received, at the time when the second recording processing unit actually records the information. Namely, the determination as to whether the optional function is installed on the vehicle is fixed or confirmed, not at the time when the second vehicle behavior is detected, but at the time when the second vehicle information corresponding to the second vehicle behavior is actually recorded. With this arrangement, when the transmission signal cannot be received, due to a communication failure, for example, it is possible to curb occurrence of a situation where the second vehicle information corresponding to the second vehicle behavior different from the first vehicle behavior as activation of the optional function is recorded in the first area. Namely, the reliability of data of vehicle information corresponding to activation of the optional function and recorded in the first area can be enhanced.

Embodiment 5

In the on-board recording system described in any one of the embodiments 1 through 4, the control device includes a first control device that performs control associated with a first driving assistance function as the driving assistance function, and a second control device that performs control associated with a second driving assistance function as the driving assistance function. The first vehicle behavior is activation of the first driving assistance function, and the second vehicle behavior is activation of the second driving assistance function. When the received information indicates that both of the transmission signal corresponding to the first driving assistance function and the transmission signal corresponding to the second driving assistance function have been received, the recording permitting unit permits the first recording processing unit to record the first vehicle information in the first area, and permits the second recording processing unit to record the second vehicle information in the second area, while inhibiting the second recording processing unit from recording the second vehicle information in the first area. When the received information indicates that the transmission signal corresponding to the first driving assistance function has not been received, and the transmission signal corresponding to the second driving assistance function has been received, the recording permitting unit permits the second recording processing unit to record the second vehicle information in the first area and the second area.

According to the embodiment 5, the control device includes the first control device that performs control associated with the first driving assistance function (first optional function) as a driving assistance function (optional function) as optional equipment, and the second control device that performs control associated with the second driving assistance function (second optional function) as an optional function. Assuming that the first vehicle behavior is activation of the first optional function, and the second vehicle behavior is activation of the second optional function, when the received information indicates that both of the transmission signal corresponding to the first optional function and the transmission signal corresponding to the second optional function have been received, it can be determined that both of the first optional function and the second optional function are installed on the vehicle. Therefore, in this case, the recording permitting unit permits the first recording processing unit to record the first vehicle information in the first area, and permits the second recording processing unit to record the second vehicle information in the second area, while inhibiting the second recording processing unit from recording the second vehicle information in the first area, so that data of the first vehicle information corresponding to the first vehicle behavior and data of the second vehicle information corresponding to the second vehicle behavior are not recorded in the same recording area; therefore, the reliability of data can be assured. On the other hand, when the received information indicates that the transmission signal corresponding to the first optional function has not been received, and the transmission signal corresponding to the second optional function has been received, it can be determined that the first optional function is not installed on the vehicle, and the second optional function is installed on the vehicle. Therefore, in this case, the recording permitting unit permits the second recording processing unit to record the second vehicle information in the first area and the second area, so that the first area corresponding to activation (first vehicle behavior) of the first optional function that can be determined as not being installed on the vehicle can be effectively utilized for recording the second vehicle information corresponding to activation (second vehicle behavior) of the second optional function. In particular, the amount of data of vehicle information that is absolutely collected, as data of vehicle information corresponding to vehicle behavior as activation of an optional function, tends to be small, as compared with data of vehicle information corresponding to vehicle behavior as activation of a driving assistance function (standard function) of a standard function. Therefore, when it is determined that the first optional function is not installed, the second vehicle information corresponding to the second vehicle behavior as activation of the second optional function that has already been determined as being installed can be recorded in the first area in addition to the second area, so that an increased amount of data of vehicle information corresponding o the type of vehicle behavior as activation of the optional function can be collected, thus permitting more useful analysis thereof.

What is claimed is:

1. A system comprising:
a first device comprising a first processor and a first memory and being configured to transmit repeatedly a CAN frame having a predetermined CAN-ID from start of the vehicle to stop of the vehicle; and
a second device connected with the first device via an on-board network and comprising:
a second memory having a first recording region and a second recording region;
a transceiver configured to receive a CAN frame having a CAN-ID uniquely set for a function which is selectively installed on the vehicle; and
a second processor configured to:
 (i) determine repeatedly whether the CAN-ID included in the received CAN frame is the predetermined CAN-ID;
 (ii) record to both the first recording region and the second recording region in a case where it is determined that the CAN-ID included in the received CAN frame is the predetermined CAN-ID; and
 (iii) record only to the second recording region in a case where it is not determined that the CAN-ID included in the received CAN frame is the predetermined CAN-ID.

2. The system according to claim 1, wherein
the first device outputs to the on-board network a control command associated with activation of a driving assistance function, and
the CAN frame comprises the control command.

3. The system according to claim 1, wherein
the predetermined CAN-ID is uniquely given to a driving assistance function.

4. The system according to claim 1, wherein
when it is determined that the CAN-ID included in the received CAN frame is the predetermined CAN-ID, the second processor does not subsequently determine whether the CAN-ID included in the received CAN frame is the predetermined CAN-ID.

5. The system according to claim 1, wherein:
if the vehicle is a gasoline engine vehicle, start of the vehicle comprises turn-on of an ignition key and stop of the vehicle comprises turn-off of the ignition key; and
if the vehicle is an electric vehicle, start of the vehicle comprises start-up of an electronic control unit that performs coordinated control for the entire vehicle and stop of the vehicle comprises stop of the electronic control unit.

* * * * *